United States Patent
Barros et al.

(10) Patent No.: US 12,460,767 B2
(45) Date of Patent: Nov. 4, 2025

(54) ARM ASSEMBLY

(71) Applicant: Ergotron, Inc., St. Paul, MN (US)

(72) Inventors: Michael P. Barros, Minnetonka, MN (US); Thiem Chan Duong Wong, Brooklyn Park, MN (US); Linnea Londborg, Minneapolis, MN (US); David James Prince, Saint Paul, MN (US); Saeb Salih Asamarai, Columbia Heights, MN (US); John William Theis, St. Paul, MN (US)

(73) Assignee: Ergotron, Inc., St. Paul, MN (US)

( * ) Notice: Subject to any disclaimer, the term of this patent is extended or adjusted under 35 U.S.C. 154(b) by 310 days.

(21) Appl. No.: 18/003,134

(22) PCT Filed: Jun. 18, 2021

(86) PCT No.: PCT/US2021/038026
§ 371 (c)(1),
(2) Date: Dec. 22, 2022

(87) PCT Pub. No.: WO2021/262544
PCT Pub. Date: Dec. 30, 2021

(65) Prior Publication Data
US 2023/0288023 A1    Sep. 14, 2023

Related U.S. Application Data

(60) Provisional application No. 63/062,101, filed on Aug. 6, 2020, provisional application No. 63/043,230, filed on Jun. 24, 2020.

(51) Int. Cl.
| F16M 13/02 | (2006.01) |
| F16M 11/08 | (2006.01) |
| F16M 11/38 | (2006.01) |

(52) U.S. Cl.
CPC .......... F16M 13/022 (2013.01); F16M 11/08 (2013.01); F16M 11/38 (2013.01); F16M 2200/022 (2013.01); F16M 2200/068 (2013.01)

(58) Field of Classification Search
CPC ...... F16M 13/022; F16M 11/08; F16M 11/38; F16M 11/041
(Continued)

(56) References Cited

U.S. PATENT DOCUMENTS

| 6,409,134 B1 | 6/2002 | Oddsen, Jr. |
| 8,254,092 B2 | 8/2012 | Russell et al. |

(Continued)

FOREIGN PATENT DOCUMENTS

| CN | 116157612 | 5/2023 |
| DE | 112021003365 | 5/2023 |
| WO | WO-2021262544 A1 | 12/2021 |

OTHER PUBLICATIONS

"International Application Serial No. PCT US2021 038026, International Preliminary Report on Patentability mailed Jan. 5, 2023", 11 pgs.

(Continued)

Primary Examiner — Todd M Epps
(74) Attorney, Agent, or Firm — Schwegman Lundberg & Woessner, P.A.

(57) ABSTRACT

A workstation holding electronic devices, e.g., a display, keyboard, or the like, can be mounted on a structure, e.g., a wall, using an articulating arm assembly including one or more arms. The one or more arms can be rotatingly coupled to the structure. The one or more arms can be configured to translate the workstation between a contracted orientation and extended orientation. The arm assembly can include a configurable rotation stop assembly. The rotation stop (Continued)

assembly can be configured to limit a rotation angle of the one or more arms in a range between 0 degrees in the contracted orientation and less than 180 degrees in the extended orientation.

20 Claims, 25 Drawing Sheets

(58) Field of Classification Search
USPC .................................................. 248/278.1
See application file for complete search history.

(56) References Cited

U.S. PATENT DOCUMENTS

| | | | |
|---|---|---|---|
| 9,945,498 B2 | 4/2018 | Timoszyk et al. | |
| 10,948,946 B2* | 3/2021 | Borloz | F16M 11/38 |
| 11,397,450 B2* | 7/2022 | Borloz | F16M 13/02 |
| 11,530,774 B2 | 12/2022 | Borloz et al. | |
| 11,994,255 B2* | 5/2024 | Barros | F16M 11/10 |
| 2005/0105257 A1 | 5/2005 | Shimizu et al. | |
| 2005/0230585 A1 | 10/2005 | Hung | |
| 2007/0040084 A1* | 2/2007 | Sturman | F16M 11/041 |
| | | | 248/280.11 |
| 2009/0242352 A1* | 10/2009 | Altonji | F16D 63/006 |
| | | | 192/139 |
| 2011/0239233 A1* | 9/2011 | Yoguchi | G11B 17/0515 |
| | | | 720/600 |
| 2016/0367027 A1 | 12/2016 | Voigt et al. | |
| 2017/0340831 A1 | 11/2017 | Giambattista et al. | |
| 2018/0352189 A1 | 12/2018 | Massey | |
| 2019/0061639 A1* | 2/2019 | Fischer | B64D 11/00153 |

OTHER PUBLICATIONS

"International Application Serial No. PCT/US2021/038026, International Search Report mailed Nov. 4, 2021", 2 pgs.

"International Application Serial No. PCT/US2021/038026, Written Opinion mailed Nov. 4, 2021", 9 pgs.

* cited by examiner

ARM ASSEMBLY

CLAIM OF PRIORITY

This patent application is a U.S. National Stage Application which claims priority to PCT Application No PCT/US2021/038026, "entitled "ARM ASSEMBLY" filed on Jun. 18, 2021 and published as WO 2021/262544 A1, on Dec. 30, 2021, which claims the benefit of priority to Barros, et al. U.S. Provisional Patent Application Ser. No. 63/043,230, entitled "ARM ASSEMBLY HAVING A RECONFIGURABLE ROTATION STOP", filed on Jun. 24, 2020, and Barros, et al. U.S. Provisional Patent Application Ser. No. 63/062,101, entitled "ARM ASSEMBLY HAVING A RECONFIGURABLE ROTATION STOP", filed on Aug. 6, 2020, all of which are hereby incorporated by reference herein in their entirety.

TECHNICAL FIELD

This document pertains generally, but not by way of limitation, to a workstation having a keyboard tray and a display mount coupled to a structure, more specifically an articulating arm assembly for adjusting the position of the workstation relative to the structure.

BACKGROUND

Workstations holding one or more electronic equipment (e.g., one or more displays, an input device, or the like) are commonly used in modern offices, hospitals, industrial facilities, or other places. These workstations can include an articulating arm assembly, and they can be mounted on a structure (e.g., a wall, a desk, or the like). The arm assembly can provide either height adjustment or articulation or both for the electronic equipment coupled to the workstation. A user of the workstation can easily adjust an orientation of the electronic equipment to fit changing posture of the user throughout the day using the arm assembly.

In order to reduce the space occupied by the workstation when it is not in active use, the workstation can be generally stored in a stowed orientation where the arm assembly can be collapsed close to the mounting location on the structure. However, during the use of the workstation, the display and the input device can be pulled away from the mounting location in an extended orientation. In the extended orientation, the workstation can be more accessible and it can allow the user to interact with user's environment (e.g., to interact with a patient in a hospital room). A workstation that can be easily manipulated between the stowed orientation and the extended orientation will improve user satisfaction, and it will be adjusted more frequently to provide a better ergonomic positioning for the user.

BRIEF DESCRIPTION OF THE DRAWINGS

The following drawings are illustrative of particular embodiments of the present invention and therefore do not limit the scope of the invention. The drawings are not to scale and are intended for use in conjunction with the explanations in the following detailed description. Embodiments of the present invention will hereinafter be described in conjunction with the appended drawings. The drawings illustrate generally, by way of example, but not by way of limitation, various embodiments discussed in the present document.

OVERVIEW

This disclosure describes a workstation having an articulating arm assembly to support one or more electronic devices including, but not limited to, electronic displays, keyboards, laptops and other computing equipment, medical equipment, scanners, and the like. The workstation can be mounted on a structure including any fixed or mobile support surface (e.g., a wall, a desk, a pole, a cart, or the like). The articulating arm assembly can allow the workstation to translate between a range of positions between stowed and extended orientations.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
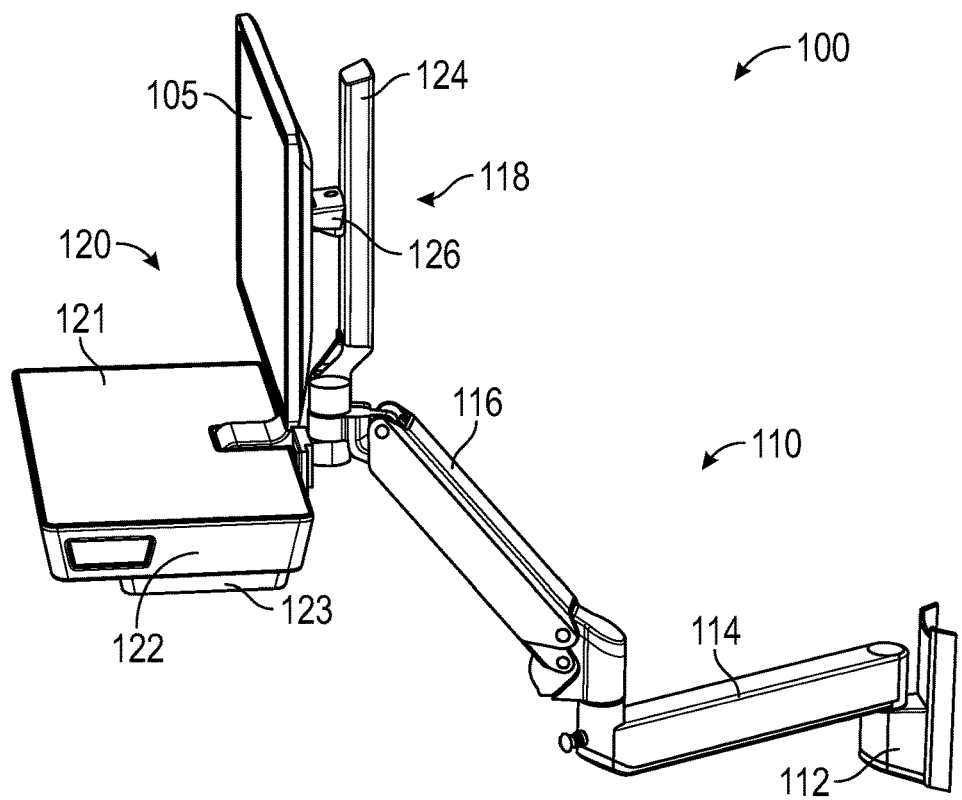
FIG. 1 is a perspective view of an example of a workstation having an arm assembly in an extended orientation.
Figure 2:
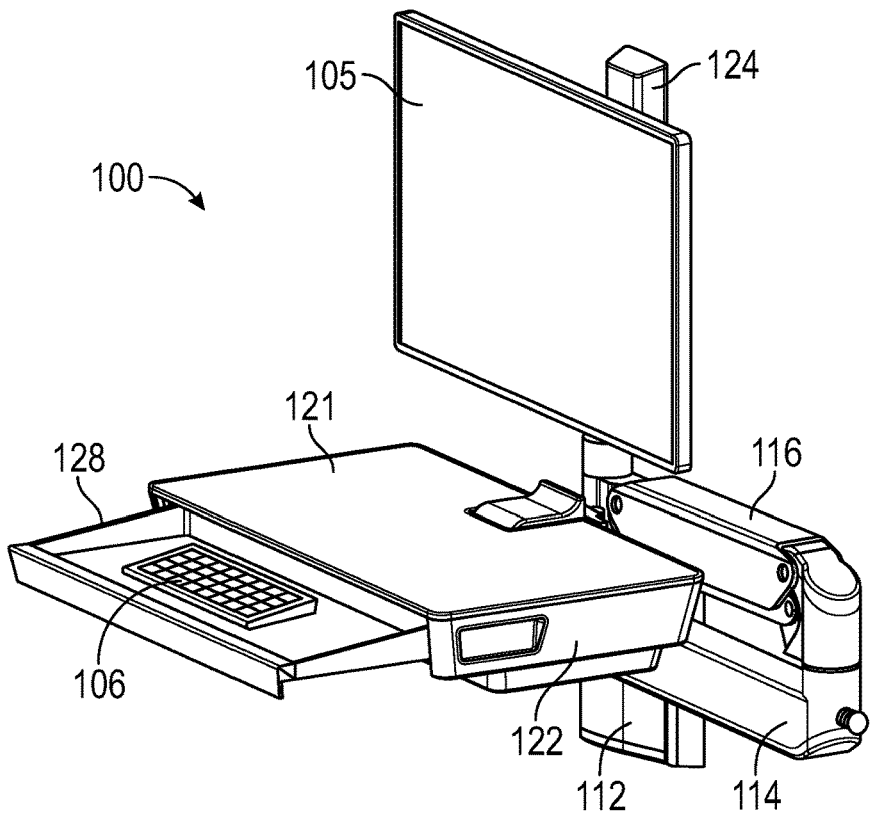
FIG. 2 is a perspective view of the workstation of Figure t in a stowed orientation.

FIGS. 1-2 are perspective views of a workstation 100 including an arm assembly 110 in an extended orientation and in a stowed orientation, respectively, according to some example configurations of the current disclosure. The arm assembly 110 can be coupled to a structure interface 112 on one end, and a mount assembly 120 can be coupled to the arm assembly 110 on the other end. The arm assembly 110 can be configured to change a position of the mount assembly 120 relative to the structure interface 112. In some example configurations, the arm assembly 110 can include a first arm 114 (e.g., an extension arm) and a second arm 116 (e.g., a height adjustable arm) rotatingly coupled to the first arm 114. The arm assembly 110 can translate the mount assembly 120 horizontally between the extended orientation and the stowed orientation relative to the structure interface 112.

The structure interface 112 can be mounted on a fixed or mobile structure (e.g., a wall, a desk, a cart, a pole, or the like). In some example configurations, the structure interface 112 can include an interface bracket. The interface bracket can be directly mounted on a structure (e.g., wall mounting bracket). In other configurations, the structure interface 112 can include an interface assembly (not shown). The interface assembly can include one or more components to mount the arm assembly 110 on a structure. For example, the interface assembly can include an interface bracket and a wall track. The wall track can be mounted on a wall, and the interface bracket can be coupled to the wall track.

In some example configurations, the mount assembly 120 can include a display interface 118 and a support tray 122. The display interface 118 and the support tray 122 can be coupled to the arm assembly 110, The display interface can further include a support column 124 and a tilt assembly 126 coupled to the support column 124. The tilt assembly 126 can include a display interface bracket 129 (shown on FIG. 4). The display interface bracket 129 can be adapted to be coupled to an electronic display 105. The display interface 118 can be configured to hold an electronic display 105 above the support tray 122, and the display interface 118 can be configured to change an orientation of the electronic display 105 relative to the support tray 122 (e.g., change a distance or angle of the electronic display 105 relative to the support tray 122.

In some example configurations, a worksurface 121 can be coupled to the support tray 122. The user of the workstation 100 can place personal equipment (e.g., papers, a notebook, a calculator, one or more pens, or the like) on the worksurface 121. In some example configurations, a keyboard can be placed over the worksurface 121.

Figure 4:
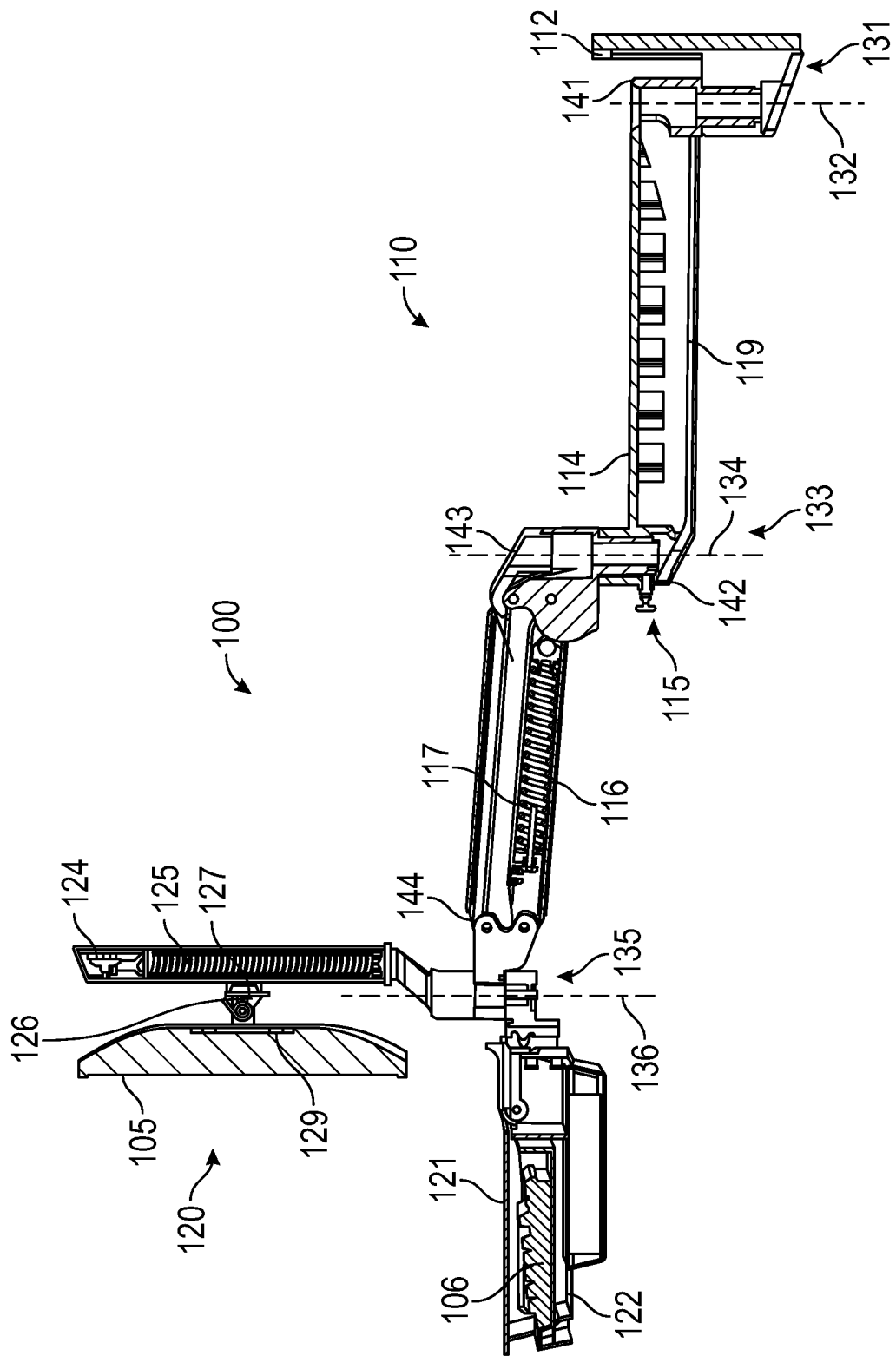
FIG. 4 is a cross-sectional side view of an example of a workstation having an arm assembly in an extended orientation.

In other example configurations, a slide out tray 128 can be coupled to the support tray 122 as illustrated in FIG. 2. The slide out tray 128 can be used to hold an input device (e.g., a keyboard 106). A keyboard 106 can be placed over the slide out tray 128. The slide out tray 128 can translate between a stowed configuration where the key board 106 can be stowed under the worksurface 121 (as shown in FIG. 4) and an extended configuration where the keyboard tray (e.g., the slide out tray 128) can be pulled out (e.g., to locate it in front of the worksurface 121) to make it accessible as illustrated in FIG. 2. In some example configurations, the slide out tray 128 can be used as a drawer to store personal items.

Figure 3A:
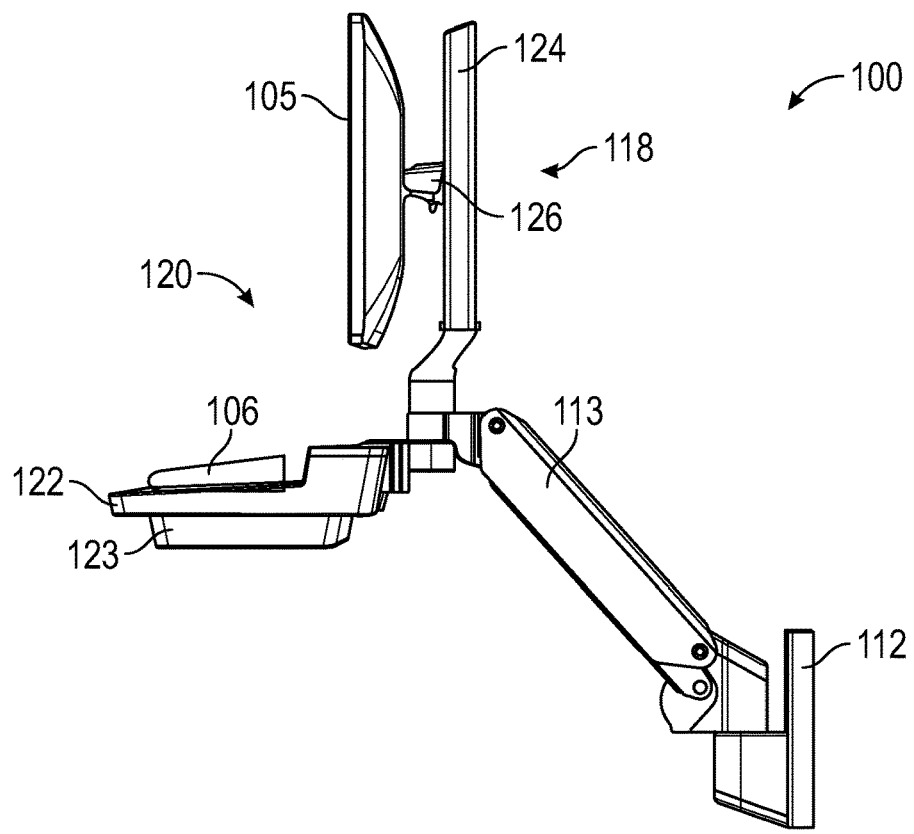
FIG. 3A is a side view of an example of a workstation having a single height adjustable arm.
Figure 3B:
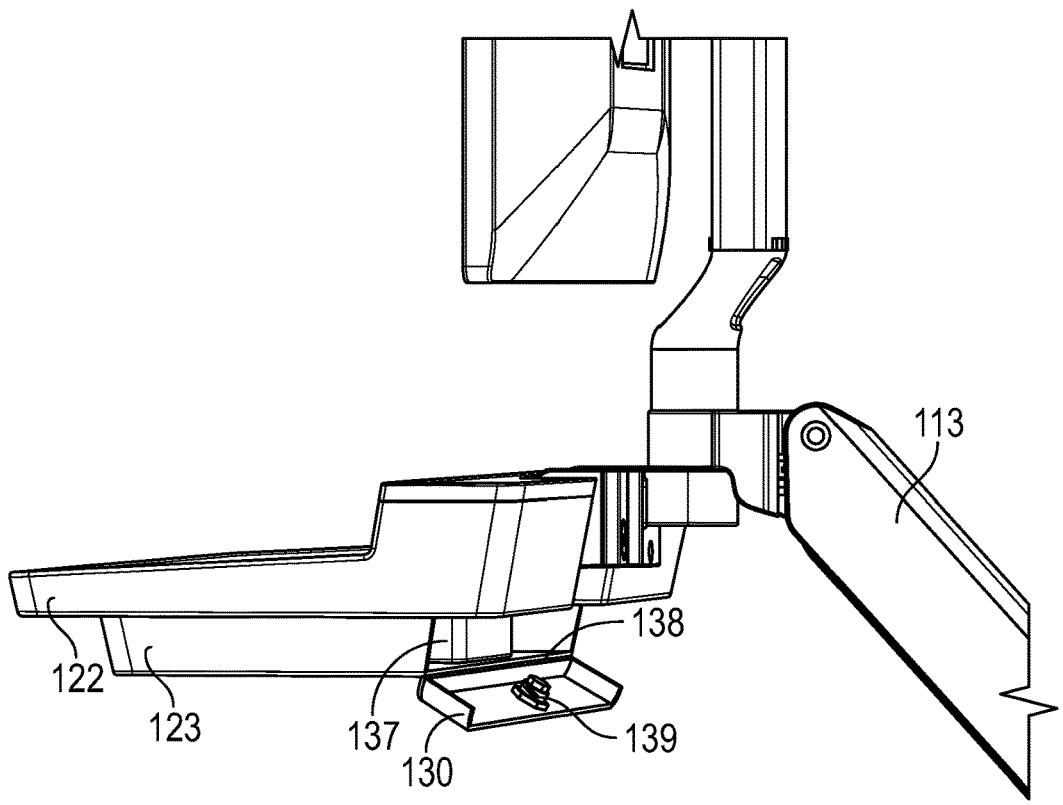
FIG. 3B is a close-up perspective view of the support tray of the workstation of FIG. 3A.

In some example configurations, a storage compartment 123 can be coupled to the support tray 122 as illustrated in FIGS. 3A-3B. The storage compartment 123 can be formed as part of the support tray 122. The storage compartment 123 can be used to store one or more electronic components including, but not limited to, a computer 137 (e.g., a fat, thin, or zero client), a charging adaptor, one or more cables, or the like.

FIG. 3A is a side view of a workstation 100 according to an example configuration of the current disclosure. The arm assembly 110 can include a single arm (e.g., a height adjustable arm 113) where the height adjustable arm can be similar to the second arm 116 of FIG. 1. The arm assembly 110 can be rotatingly coupled to a structure interface 112 on one end, and a mount assembly 120 can be coupled to the other end. The mount assembly 120 can further include a support tray 122 and a display interface 118. The display interface 118 can be configured to hold an electronic display 105 over the support tray 122. An input device (e.g., a keyboard 106) can be located over the support tray 122. The arm assembly 110 can be used to change an orientation (e.g., vertical orientation, horizontal orientation, or both) of the electronic display 105 and the keyboard 106 relative to the structure interface 112.

FIG. 3B is a close-up perspective view of the rear end of the support tray 122. A storage compartment 123 can be coupled to an underside of the support tray 122. A door 130 can be rotatingly coupled to the storage compartment 123 proximate to its rear end. The door 130 can rotate relative to the storage compartment 123 at a hinge 138. A key lock 139 can be coupled to the door 130. The key lock 139 can be locked in a closed orientation of the door (e.g., door 130 can be rotated upwards towards the storage compartment 123) to secure the one or more electronic components (e.g., a computer 137) located inside the storage compartment 123. The key lock 139 can be selectively unlocked to access the components located inside the storage compartment 123.

FIG. 4 is a cross-sectional side view of the workstation 100 of FIG. 1 according to an example configuration of the current disclosure. The arm assembly 110 can include a first arm 114 and a second arm 116. The first arm can be an elongated arm having a first end 141 and a second end 142. The first end 141 of the first arm 114 can be rotatingly coupled to a structure interface 112 (e.g., a wall interface) at a first hinge 131. The first arm 114 can rotate around a first axis 132 formed by a first hinge 131 relative to the structure interface 112. The second arm 116 can be a height adjustable arm having a first end 143 and a second end 144. The first end 143 of the second arm 116 can be rotatingly coupled to the second end 142 of the first arm 114 at a second hinge 133. The second arm 116 can rotate around a second axis 134 formed by the second hinge 133 relative to the first arm 114. A mount assembly 120 can be rotatingly coupled to the second end 144 of the second arm 116 at a third hinge 135. The mount assembly 120 can rotate around a third axis 136 formed by the third hinge 135 relative to the second arm 116. The first axis 132, the second axis 134 and the third axis 136 can be parallel to each other and they can be in a vertical direction.

In some example configurations, the second arm 116 can be a height adjustable arm. The second arm 116 can include an arm counterbalance mechanism 117. The arm counterbalance mechanism 117 can be configured to lift at least a portion of the combined weight coupled to the second arm 116 (e.g., combined weight of a display, a keyboard, mount assembly 120, support tray 122 and all the components coupled to the support tray 122, and others).

The mount assembly 120 can include a support column 124. The support column 124 can be rotatingly coupled to the second arm 116 at the third hinge 135. In some example configurations, the support column 124 can further include a lift counterbalance mechanism 125. The lift counterbalance mechanism can be configured to counterbalance at least a portion of the weight of an electronic display 105 coupled to the mount assembly 120.

In some example configurations, a tilt assembly 126 can be coupled to the support column 124. The tilt assembly 126 can be slidingly engaged with the support column 124. The tilt assembly 126 can include a display interface bracket 129. The display interface bracket 129 can be adapted to be coupled to an electronic display 105. In some example configurations, the tilt assembly 126 can further include a tilt counterbalance mechanism 127. The tilt counterbalance mechanism 127 can be configured to tilt the display around a horizontal axis (not shown) relative to the arm assembly 110.

In some example configurations, a support tray 122 can be rotatingly coupled to the arm assembly 110 at the third axis 136. The support tray 122 and the mount assembly 120 can be configured to rotate around the third axis 136 simultaneously. In some example configurations, the mount assembly 120 can also rotate around the third axis 136 relative to the support tray 122 independently. In some example configurations, a worksurface 121 and a slide out tray 128 can be couple to the support tray 122.

Figure 9:
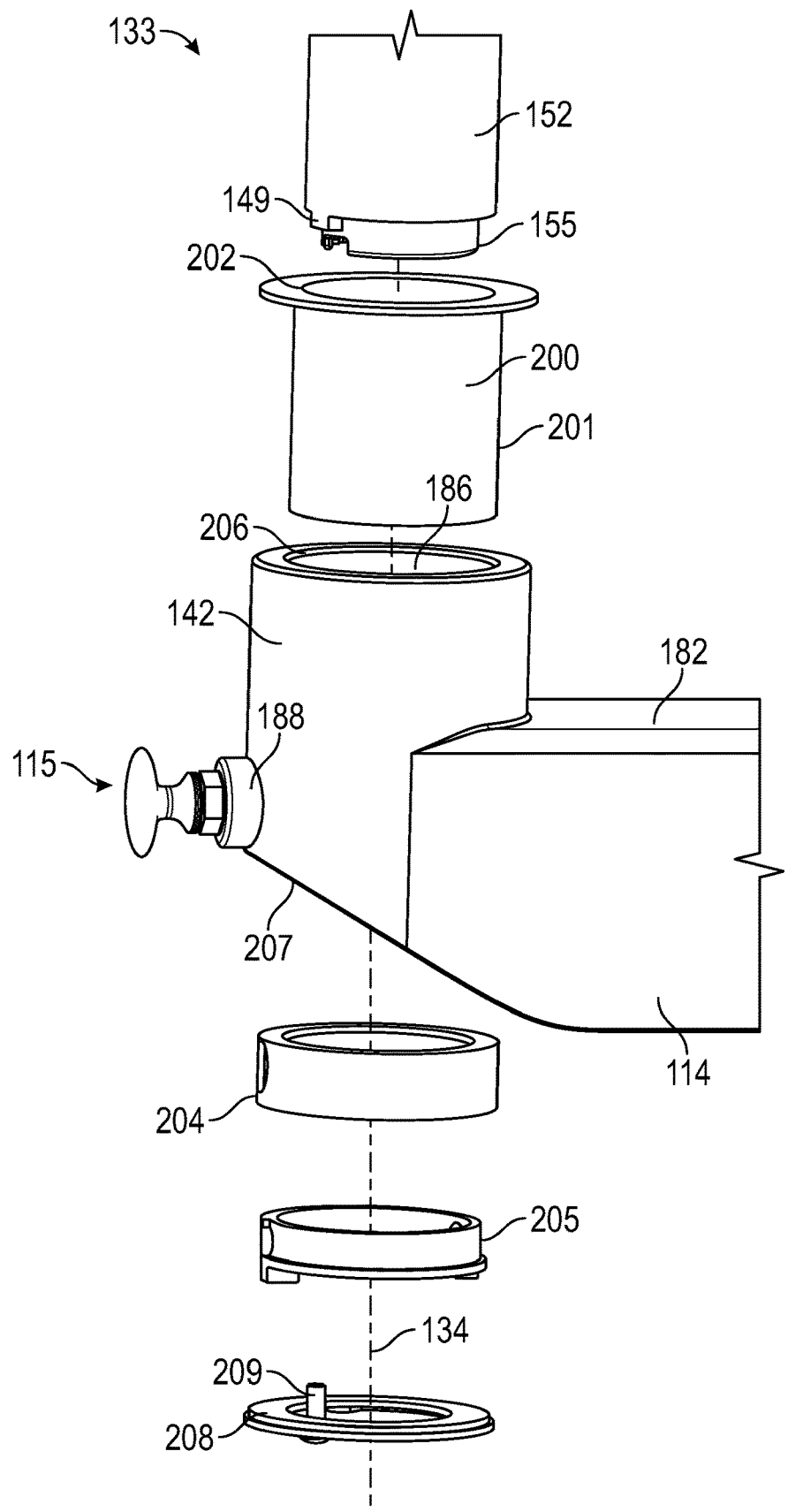
FIG. 9 is an exploded view of the second hinge of the arm assembly of FIG. 4.

In some example configurations, the second arm 116 can be rotatingly coupled to the first arm 114 at the second axis 134. The second arm 116 can be configured to rotate in clockwise or counterclockwise directions relative to the first arm 114. In some example configurations, a rotation stop assembly 115 can be included in the arm assembly 110 at the interface between the first arm 114 and the second arm 116. The rotation stop assembly 115 can be selectively configured by the user of the workstation to adjust it for clockwise or counterclockwise rotation as it will be discussed in the following sections of this disclosure. In some example configurations, the rotation stop assembly 115 can be coupled to the first arm 114 as illustrated in FIG. 9, in other example configurations, the rotation stop assembly 115 can be coupled to the second arm 116.

Figure 5:
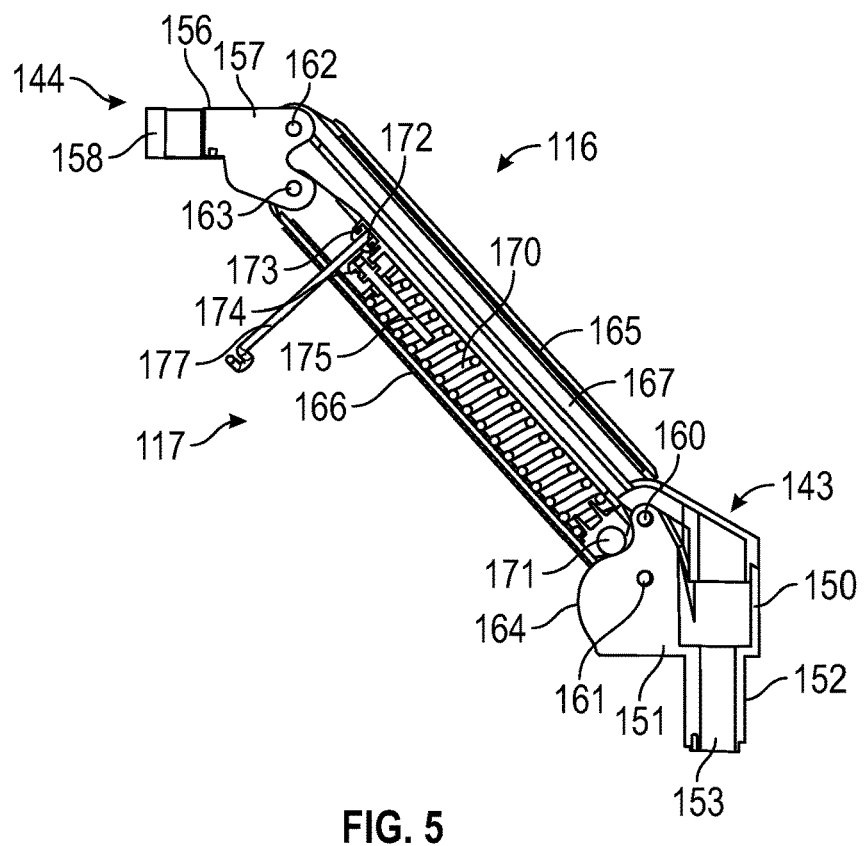
FIG. 5 is a cross-sectional side view of an example of a height adjustable arm assembly.

FIG. 5 is a cross-sectional side view of the second arm 116 of FIG. 4 according to an example configuration of the current disclosure. The second arm can be an elongated arm between a first end 143 and a second end 144. The second arm 116 can include a first block 150 proximate the first end 143 and a second block 156 proximate to the second end 144.

Figure 6:
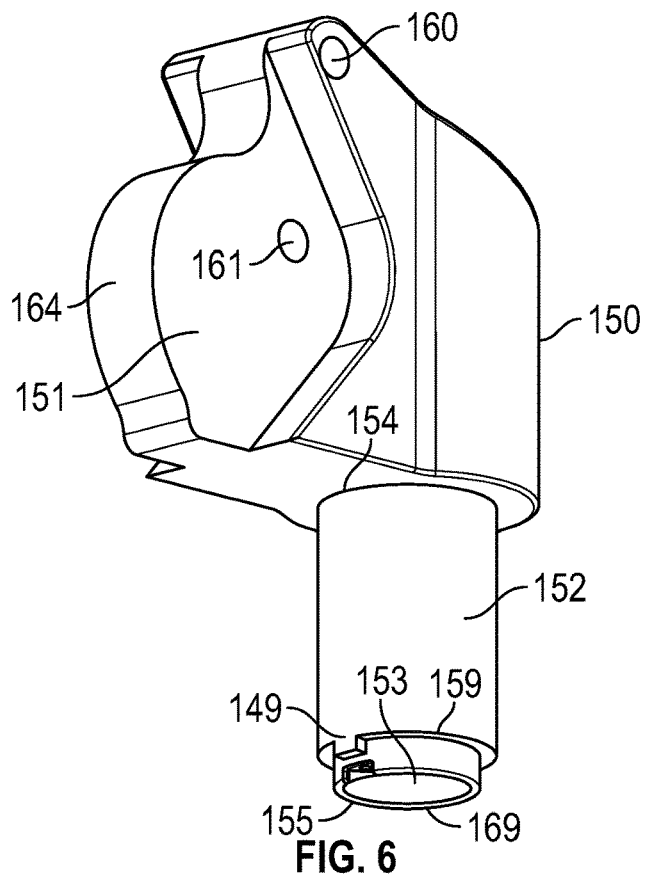
FIG. 6 is a perspective view of an example of a first block of the height adjustable arm assembly of FIG. 5.

FIG. 6 is a perspective view of the first block 150 according to an example configuration of the current disclosure. The first block 150 can have a first block body 151 and a first block shaft 152. The first block shaft 152 can be an elongated member between an upper end 154 and a lower end 155. The upper end 154 of the first block shaft 152 can be coupled to the first block body 151. The first block shaft 152 can have a round cross-section with a first outside diameter 159, and a second outside diameter 169 proximate the lower end 155. The second outside diameter 169 can be smaller than the first outside diameter 159. The first block shaft 152 can be useful to rotatingly couple the second arm to the first arm 114. A first through hole 160, a second through hole 161, and a cam 164 can be formed as parts of the first block body 151. In some example configurations, the cam 164 can include a non-linear profile.

The first block 150 can further include a first aperture 153. The first aperture 153 can extend through the first block body 151 and the first block shaft 152. The first aperture 153 can be useful to rout one or more cables through the first block 150.

The second block 156 can have a second block body 157 and a second block flange 158 can be coupled to the second block body 157. The second block body 157 can have a third through hole 162 and a fourth through hole 163. The second block flange 158 can extend form the second block body 157. The mount assembly 120 can be coupled to the second block flange 158.

The second arm 116 can further include an upper link arm 165 and a lower link arm 166. The upper link arm 165 can be rotatingly coupled to the first block 150 in one end and rotatingly coupled to the second block 156 in the other end. The lower link arm 166 can be rotatingly coupled with the first block 150 in one end and rotatingly coupled to the second block 156 in the other end.

A first axle (not shown) can be inserted through the first through hole and it can be coupled with the upper link arm 165 to form a first upper hinge between the upper link arm 165 and the first block 150. A second axle (not shown) can be inserted through the second through hole 161 and it can be coupled with the lower link arm 166 to form a first lower hinge between the lower link arm 166 and the first block 150. A third axle (not shown) can be inserted through the third through hole 162 and it can be coupled with the upper link arm 165 to form a second upper hinge between the upper link arm 165 and the second block 156. A fourth axle (not shown) can be inserted through the fourth through hole 163 and it can be coupled with the lower link arm 166 to form a second lower hinge between the lower link arm 166 and the second block 156.

The upper link and the lower link can be parallel to each other to form a parallel linkage to provide height adjustment for the second block 156 relative to the first block 150. The upper link arm 165 and the lower link arm 166 can stay parallel during the height adjustment to keep the second block 156 leveled relative to the first block 150 throughout the height adjustment.

In some example configurations, the second arm 116 can further include an arm counterbalance mechanism 117 to provide lift assist during the height adjustment. The arm counterbalance mechanism 117 can provide a lift force to counteract at least a portion of the combined weight (e.g., combined weight of the support tray 122, the mount assembly 120, electronic display 105, or the like) attached to the second arm 116. Additional information regarding the arm counterbalance mechanism 117 can be found in commonly assigned U.S. Pat. No. 7,252,277 to Sweere et al., which is incorporated by reference in its entirety.

The arm counterbalance mechanism 117 can include an energy storage member 170 (e.g., a compression spring). The energy storage member 170 can be coupled to the lower link arm 166. The energy storage member 170 can have a first end and a second end. A cam follower 171 can be coupled to the first end of the energy storage member 170, and an adjustment bracket 172 can be coupled to the second end of the energy storage member 170. The adjustment bracket 172 can have a threaded hole.

A First bevel gear 173 and a second bevel gear 174 can be coupled to the lower link arm 166 proximate to the second end of the energy storage member 170. The second bevel gear 174 can be in transverse direction to the First bevel gear 173. The second bevel gear 174 can be coupled to the First bevel gear 173 such that a rotation of the First bevel gear 173 can cause a rotation of the second bevel gear 174.

An adjustment screw 175 can be coupled to the second bevel gear 174. Adjustment screw 175 can rotate with the second bevel gear 174 in unison. The adjustment screw 175 can be inserted through the threaded hole located on the adjustment bracket 172 such that the adjustment screw 175 can be threadingly engaged with the adjustment bracket 172. The adjustment screw 175 can be configured to translate the adjustment bracket 172 in axial direction of the adjustment screw 175 to change a tension of the energy storage member 170 (e.g., compression spring). A tool 177 can be inserted through an aperture (not shown) on the lower link arm 166 to engage with the First bevel gear 173. The tool 177 can be rotated to cause a rotation on the First bevel gear 173 and the second bevel gear 174, and thus, rotating the adjustment screw 175 to adjust the tension on the energy storage member 170.

The height of the second block 156 relative to the first block 150 can be adjusted between a raised position and a lowered position. The energy storage member 170 can bias the second block 156 in the raised position. During the height adjustment of the second arm 116, the cam follower 171 can trace the cam profile to further vary the tension on the energy storage member 170. The cam profile can be configured to vary the tension on the energy storage member 170 such that the lift force can be substantially constant throughout the height adjustment.

In some example configurations, the second arm 116 can include a first cavity (e.g., the first cavity 167 of the upper link arm 165 of FIG. 5). The first cavity 167 can be elongated between the first end 143 and the second end 144 of the second arm 116. The first aperture 153 of the first block 150 can be connected to the first cavity 167. The first cavity 167 and the first aperture 153 can be used for cable routing throughout the second arm 116. One or more cables can enter in to the first cavity 167 proximate the second end 144 of the second arm 116, and they can be routed along the second arm 116 inside the first cavity 167 and enter in to the first aperture 153 of the first block 150 proximate the first end 143 of the second arm 116.

Figure 7:
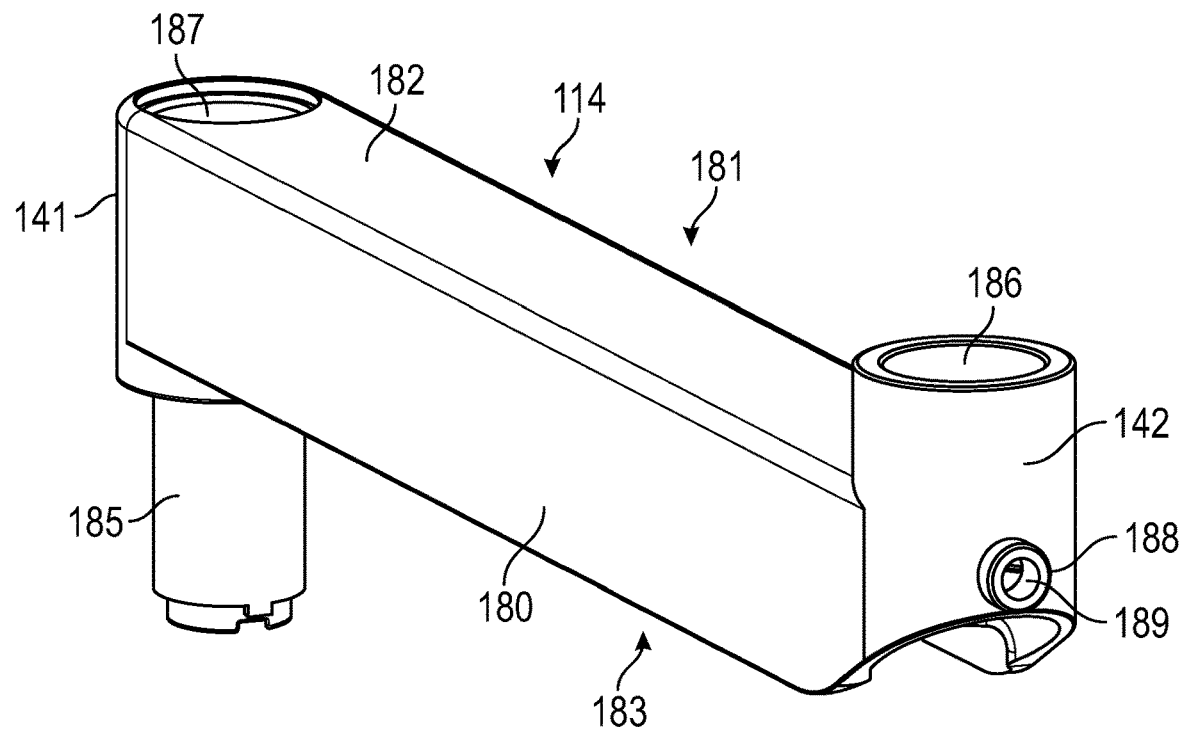
FIG. 7 is a perspective view of the extension arm of the arm assembly of FIG. 1.

FIG. 7 is a perspective view of a first arm 114 (e.g., an articulating extension arm) according to an example configuration of the current disclosure. The first arm 114 can have a first sidewall 180 and a second sidewall 181 opposite the first sidewall 180. The first sidewall 180 and the second sidewall can extend from the first end 141 of the first arm 114 to the second end 142 of the first arm 114. The first arm 114 can further include an upper wall 182 and a lower wall 183 opposite the upper wall 182. The upper wall 182 can be coupled to the first sidewall 180 and the second sidewall 181 proximate the upper end of the sidewalls, and the lower wall 183 can be coupled to the first sidewall 180 and the second sidewall 181 proximate the lower end of the sidewalls. At least a portion of the lower wall 183 can be open to have access to an interior space of the first arm 114. In some example configurations, the arm assembly 110 can include one or more covers 119. At least a portion of the lower wall 183 can be closed by the one or more covers 119 as illustrated in FIG. 4.

A second aperture 186 and a third aperture 187 can be built in to the second end 142 and the first end 141 of the first arm 114, respectively. The second aperture 186 can be in a round cross-section, and the second aperture 186 can be configured to receive the first block shaft 152.

Figure 8:
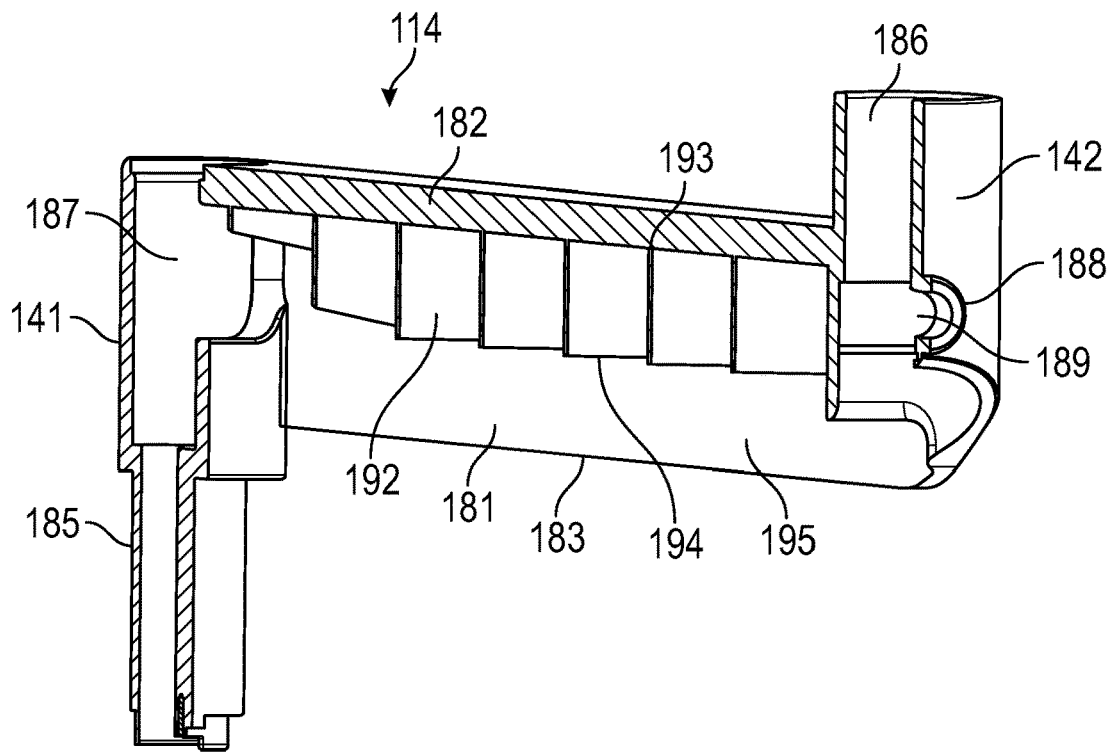
FIG. 8 is a cross-sectional view of the extension arm of FIG. 7.

FIG. 8 is a cross-sectional view of the extension arm of FIG. 7. In some example configurations, one or more ribs 192 can be built in an interior space of the first arm 114. The one or more ribs 192 can have an upper end 193 and a lower end 194. The upper end 193 of the one or more ribs 192 can be coupled to the upper wall 182. The one or more ribs 192 can also be coupled to the first sidewall 180 and the second sidewall 181 of the first arm 114 to provide stiffness. The one or more ribs 192 can extend at least partially along the height of the sidewalls. A second cavity 195 can be formed inside the first arm 114 between the lower end 194 of the one or more ribs 192 and the lower wall 183. The second aperture 186, the second cavity 195, and the third aperture 187 can be connected to route one or more cables through the first arm 114.

A first arm shaft 185 can be built in to the first end 141 of the first arm 114. The first arm shaft 185 can extend from the first arm 114. The first arm shaft 185 can be in a circular cross-section. The first arm shaft 185 can be useful to rotatingly couple the first arm 114 to the structure interface (e.g., structure interface 112 of FIG. 4). In some example configurations, the third aperture can extend through the first arm 114 and the first arm shaft 185.

A protrusion 188 can be formed proximate to the second end 142 of the first arm 114 as illustrated in FIG. 7. An access hole 189 can be built into the protrusion 188. The access hole 189 can provide access to an interior space of the first arm 114 (e.g., to the second aperture 186). In some example configurations, the access hole 189 can be threaded.

Figure 10:
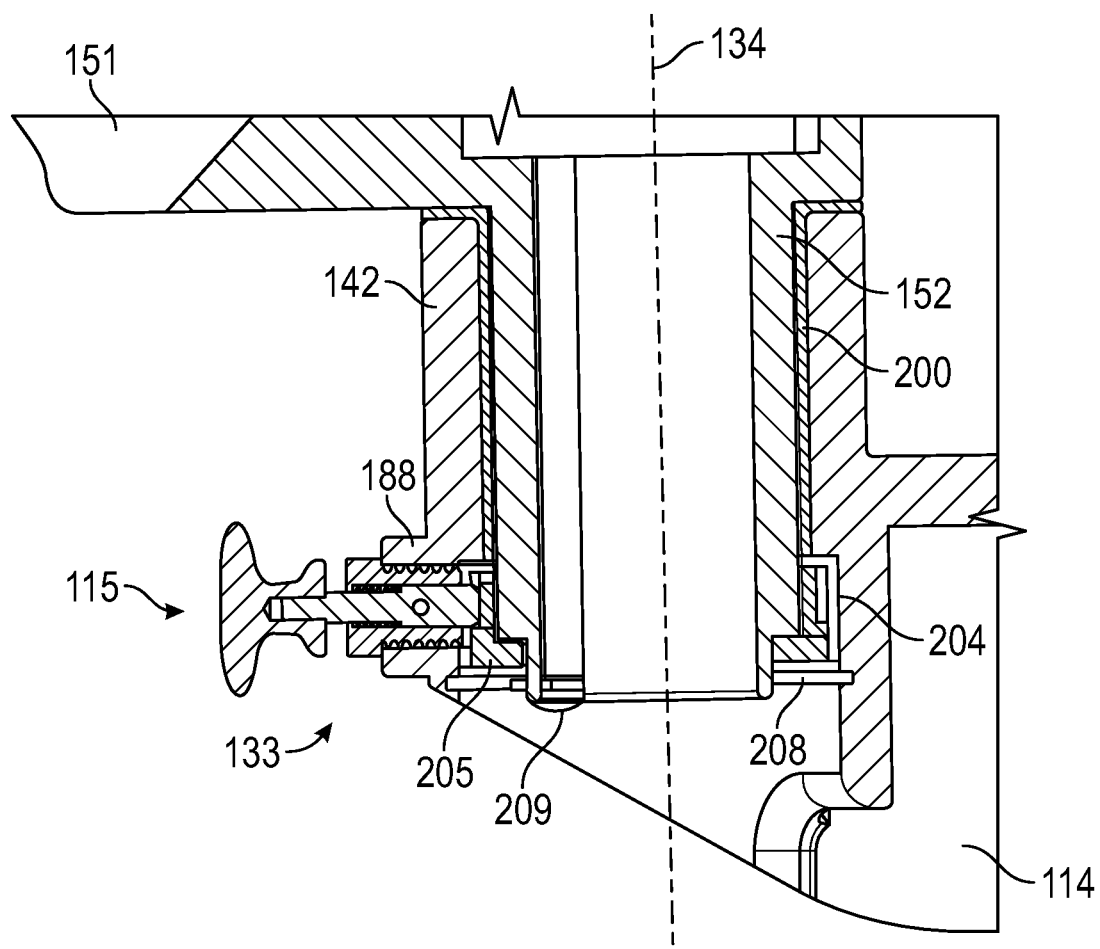
FIG. 10 is a cross-sectional side view of the second hinge of FIG. 1.

FIG. 9-10 are an exploded view and a cross-sectional view of the second hinge 133, respectively, according to an example configuration of the current disclosure. In the assembled configuration, the first block shaft 152 and the second aperture 186 can be coaxial, and their axis can coincide with the second axis 134. The second hinge 133 can include a first bushing 200. The first bushing 200 can be in a circular cross-section. An outside diameter 201 of the first bushing 200 can be smaller than the diameter of the second aperture 186, and an inside diameter 202 of the first bushing 200 can be larger than the first outside diameter 159 of the first block shaft 152. The first bushing 200 can be inserted in to the second aperture 186 from the upper end 206 of the second aperture 186. The first bushing 200 can be at least partially located inside the second aperture 186, and the first block shaft 152 can be at least partially located inside the first bushing 200. The first bushing 200 can be made of a non-metallic material (e.g., ABS, nylon, Delrin, Teflon, or the like), The first bushing 200 can reduce the friction between the first arm 114 and the second arm 116 at the second hinge 133.

The second hinge 133 can further include a second bushing 204 and a stop ring 205. The second bushing 204 and the stop ring 205 can be in circular cross-sections however several features can be formed on both the second bushing 204 and the stop ring 205 to enable a rotation stop function between the first arm 114 and the second arm 116 at the second hinge 133 as it will be apparent in the below sections of this disclosure.

A washer assembly 208 can be coupled to the lower end 207 of the second aperture 186 and secured in place by a screw 209 as illustrated in FIGS. 9-10 to prevent the second bushing 204 and the stop ring 205 from dropping out of the second aperture 186. The screw 209 can be inserted through an aperture (not shown) located on the washer assembly 208, and threadingly engage with the second end 142 of the first arm 114.

Figure 11:
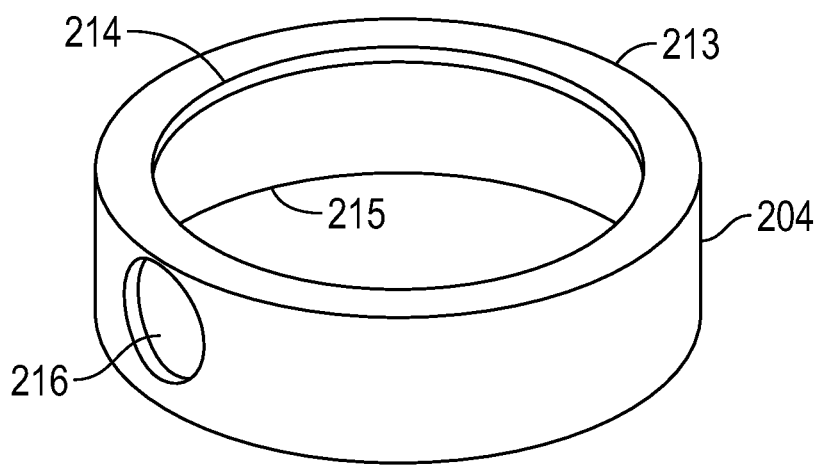
FIG. 11 is a perspective view of an example of a bushing.

FIG. 11 is a perspective view of the second bushing 204 according to an example configuration of the current disclosure. An outside diameter 213 of the second bushing 204 can be smaller than a diameter of the second aperture 186. The second bushing 204 can have a first inside diameter 214 proximate upper end and a second inside diameter 215. The second inside diameter 215 can be larger than the first inside diameter 214. The first inside diameter 214 of the second bushing 204 can be larger than the first outside diameter 159 of the first block shaft 152. The second bushing 204 can be adapted to receive the first block shaft 152 inside the first inside diameter 214. The second bushing 204 can be inserted in to the second aperture 186 from the lower end 207 of the second aperture 186. The second bushing 204 at least partially located inside the second aperture 186. The second bushing 204 can be made of a non-metallic material (e.g., ABS, nylon, Delrin, Teflon, or the like).

Figure 12:
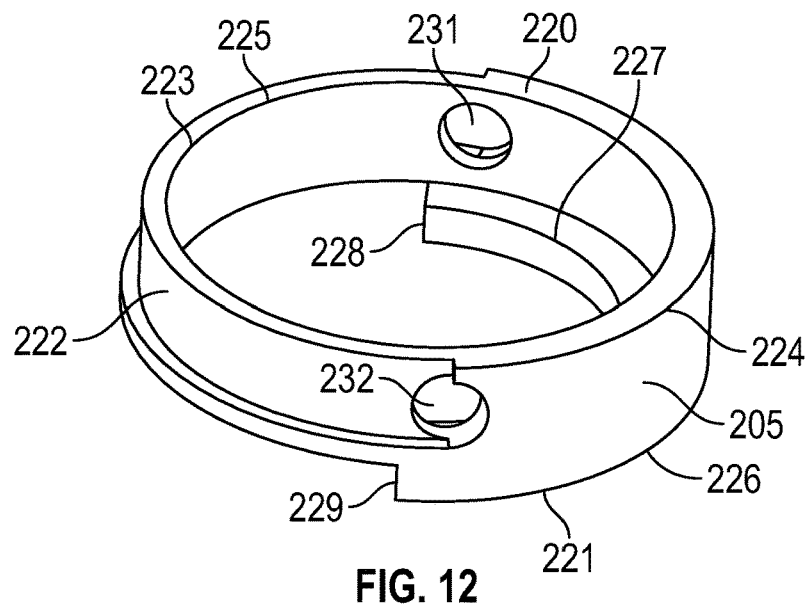
FIG. 12 is an upper perspective view of an example of a stop ring.
Figure 13:
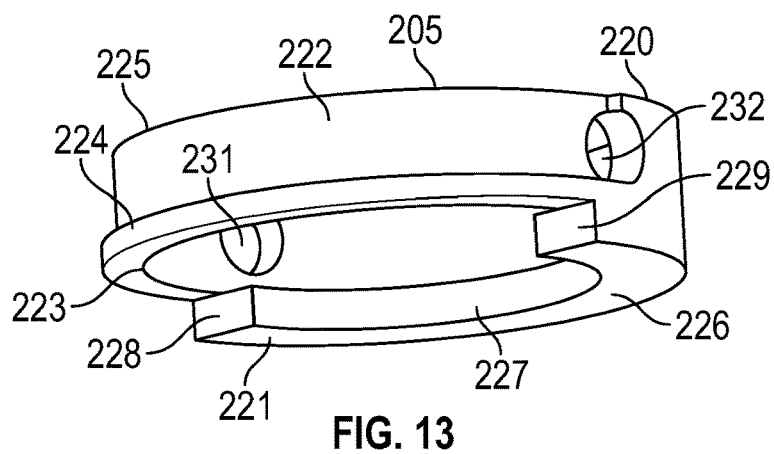
FIG. 13 is a lower perspective view of the stop ring of FIG. 12.

FIGS. 12-13 are an upper perspective view and a lower perspective view of the stop ring 205 according to an example configuration of the current disclosure. The stop ring 205 can have an inside diameter 223 and an outside diameter 224. The inside diameter 223 of the stop ring 205 can be larger than the first outside diameter 159 of the first block shaft 152. The stop ring 205 can be adapted to receive the first block shaft 152 inside the inside diameter 223. The outside diameter 224 of the stop ring 205 can be smaller than the second inside diameter 215 of the second bushing 204. The stop ring 205 can be adapted to be inserted into the second bushing 204. The stop ring 205 can be at least partially located inside the second bushing 204, and the first block shaft 152 can be at least partially located inside the stop ring 205 as illustrated in FIG. 10.

The stop ring 205 can have an upper end 220 and a lower end 221 as illustrated in FIG. 12. The stop ring 205 can further include a recessed section covering at least a portion of the circumference of the stop ring 205. The recessed section 222 can have a recessed section diameter 225 which can be smaller than the outside diameter 224 of the stop ring 205. A first lock hole 231 and a second lock hole 232 can be formed on the stop ring 205. The first lock hole 231 and the second lock hole 232 can be located proximate the ends of the recessed section 222. The stop ring 205 can be made of any material known in engineering including, but not limited to, aluminum, ABS, nylon, steel, or the like.

The stop ring 205 can further include an overhung section 226 as illustrated in FIGS. 12-13. The overhung section 226 can be coupled to the lower end 221 of the stop ring 205. The overhung section 226 can have an outside diameter and an inside diameter 227. The outside diameter of the overhung section 226 can be the same as the outside diameter 224 of the stop ring 205, The inside diameter 227 of the overhung section 226 can be smaller than the inside diameter 223 of the stop ring 205. The inside diameter 227 of the overhung section 226 can be larger than the second outside diameter 169 of the first block shaft 152. The inside diameter 227 of the overhung section 226 can be adapted to receive at least a portion of the first block shaft 152 with the second outside diameter 169.

The over hung section of the stop ring 205 can extend through a portion of the stop ring 205 in circumferential direction, for example, the overhung section 226 can be located on one third, or one half, or any other ratio of the circumference of the stop ring 205. The overhung section 226 can be terminated at a first end and a second end. The first end and the second end can form a first stop surface 228 and a second stop surface 229, respectively. The first stop surface 228 and the second stop surface 229 can be configured to cooperate with the first block shaft 152 to stop the rotation of the second arm 116 relative to the first arm 114.

Figure 14:
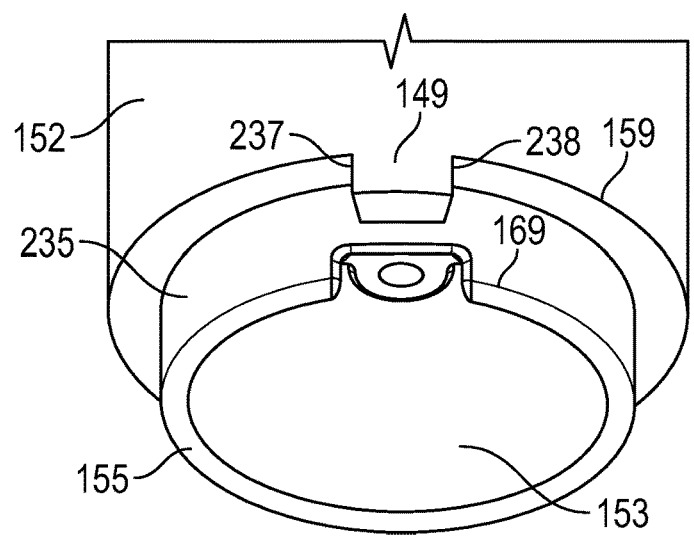
FIG. 14 is a close-up perspective view of the lower end of the first block of FIG. 6.

FIG. 14 is a perspective view of the lower end 155 of the first block shaft 152 according to an example configuration of the current disclosure, A recessed section 235 can be formed on the outside surface of the first block shaft proximate the lower end 155. The recessed section 235 can have a second outside diameter 169. The second outside diameter 169 can be smaller than the first outside diameter 159 of the first block shaft 152. A boss 149 can be formed on the recessed section 235 of the first block shaft 152. The boss 149 can extend from the first outside diameter 159 at least partially through the recessed section 235. The boss 149 can have a first side 237 and a second side 238.

In an assembled configuration (e.g., when the first block shaft 152 is inserted into the stop ring 205) as illustrated in FIG. 10, the boss 149 can be located between the first stop surface 228 and the second stop surface 229 away from the overhung section 226 of the stop ring 205. The first block shaft 152 (and thus, the boss 149) can rotate around the second axis 134 relative to the stop ring 205. The stop ring 205 can be stationary (e.g., the stop ring 205 cannot rotate around the second axis 134) relative to the first arm 114. The first side 237 of the boss 149 can be adapted to contact the first stop surface 228 to stop the rotation of the second arm 116 in one direction, and the second side 238 of the boss 149 can be adapted to contact the second stop surface 229 to stop the rotation of the second arm 116 in the other direction.

Figure 15:
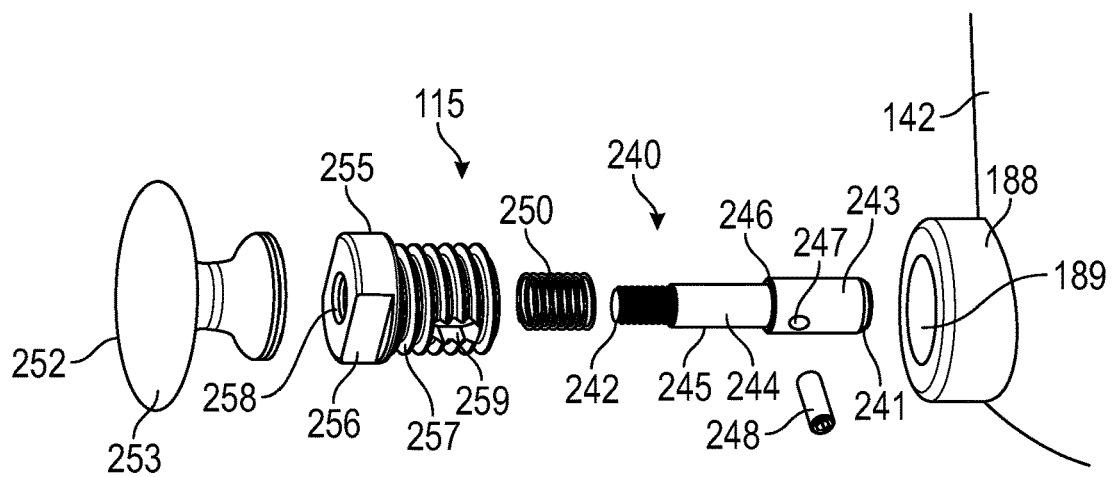
FIG. 15 is an exploded view of an example of a rotation stop assembly.

FIG. 15 is an exploded view of the rotation stop assembly 115 according to an example configuration of the current disclosure. The rotation stop assembly 115 can include a plunger 240 having a first end 241 and a second end 242. A first diameter 243 can be formed proximate the first end 241, and a threaded section can be formed proximate to the second end 242. A threaded hole 247 can be formed on the plunger 240 proximate the first end 241. A plunger shaft 244 can be formed in the middle section of the plunger 240. The plunger shaft 244 can have a second diameter 245. The second diameter 245 can be smaller than the first diameter 243. A first shoulder 246 can be formed between the first diameter 243 and the second diameter 245.

Figure 16:
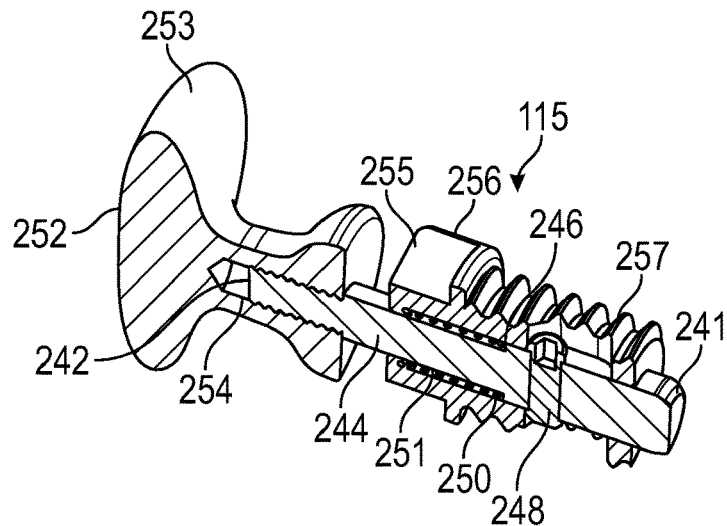
FIG. 16 is a cross-sectional view of the rotation stop assembly of FIG. 15.

The rotation stop assembly 115 can further include a nut 255. The nut can have a head 256 on one end and a threaded body 257 having a thread outside surface proximate to the other end. A through hole 258 can be formed inside the nut 255. The through hole 258 can have a smaller inside diameter creating a second shoulder 251 proximate to an end of the nut 255 where the head 256 is located as illustrated in FIG. 16. A slot 259 can be formed on the threaded body 257 of the nut 255. The threaded body 257 of the nut 255 can be threadingly engaged with the access hole 189 located on the second end 142 of the first arm 114.

The rotation stop assembly 115 can include a spring 250 (e.g., a compression spring). The plunger 240 can be inserted through the spring 250 so that the spring 250 can be located over the middle section of the plunger 240 (e.g., over the plunger shaft 244). The plunger 240 and the spring 250 can be coaxial. In the assembled configuration, the spring 250 can be trapped inside the nut between the first shoulder 246 and the second shoulder 251 as illustrated in FIG. 16.

The rotation assembly can further include a knob 252. A handle 253 can be formed in one end of the knob 252 and a threaded hole 254 can be formed in the other end of the knob 252. A user of the workstation 100 of FIG. 1 can easily manipulate the knob 252 by interacting with the handle 253.

Figure 17A:
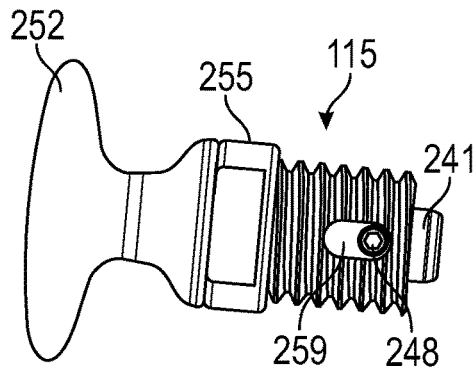
FIG. 17A is a side view of the rotation stop assembly of FIG. 15 in extended orientation.
Figure 17B:
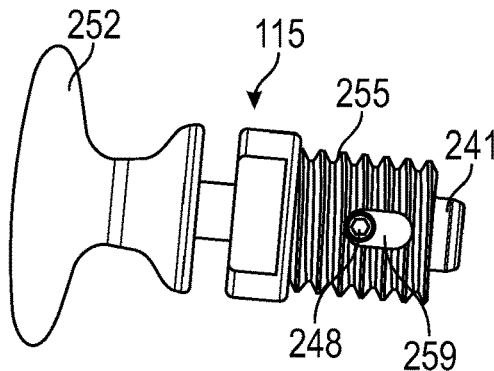
FIG. 17B is a side view of the rotation stop assembly of FIG. 15 in retracted orientation.

FIG. 16 is a cross-sectional perspective view of the rotation stop assembly 115 according to an example configuration of the current disclosure. FIGS. 17A-17B are extended and retracted configurations of the rotation stop assembly 115 of FIG. 16, respectively. The plunger 240 can be inserted through the nut 255 such that the threaded section of the plunger 240 proximate the second end 242 can be extended out of the through hole 258 proximate the head 256 of the nut 255. Once it is extended out of the through hole 258, the second end 242 of the plunger 240 can threadingly engage with the threaded hole 247 of the knob 252.

The plunger 240 can be slidingly engaged with the nut 255 between an extend configuration where the first end 241 of the plunger 240 can be at a first distance from the nut 255 (as illustrated in FIG. 17A) and a retracted configuration where the first end 241 of the plunger 240 can be at a second distance smaller than the first distance from the nut 255 (as illustrated in FIG. 17B).

In some example configurations, the rotation assembly can further have a stop pin 248. The stop pin 248 can have a threaded outside surface. In the assembled configuration as illustrated in FIG. 16, the stop pin 248 can be inserted through the slot 259 located on the threaded body 257 of the nut 255, and the stop pin 248 can threadingly engage with the threaded hole 247 located on the plunger 240. The stop pin 248 can limit the sliding motion of the plunger relative to the nut 255 between extended configuration and retracted configuration as illustrated in FIGS. 17A and 173, respectively. The spring 250 can bias the plunger 240 towards the extended configuration as illustrated in FIG. 17A. The user of the workstation 100 of FIG. 1 can interact with the knob 252 to pull the plunger 240 against the spring force to move the plunger to the retracted configuration as illustrated in FIG. 17B.

In the assembled configuration of the second hinge 133 the plunger 240 can be coaxial with the access hole 216 located on the second bushing 204 of FIG. 11. The stop ring 205 of FIG. 12 can rotate relative to the second bushing 204 so that either one of the first lock hole 231 or the second lock hole can be also coaxial with the plunger 240 and the access hole 216 of the second bushing 204. In the extended configuration of the plunger 240, the first end 241 of the plunger 240 can be configured to enter through the access hole of second bushing 204 and engage with either one of the first lock hole 231 or the second lock hole 232 of the stop ring 205. In the retracted configuration of the plunger 240, the first end 241 of the plunger 240 can be located over the recessed section 222 of the stop ring 205, and thus, the stop ring 205 can rotate relative to the rotation stop assembly 115.

The rotation stop assembly 115 can be bi-directional. The rotation stop assembly 115 can be manipulated (e.g., by interacting with the knob 252) to change the orientation of the first stop surface 228 and the second stop surface of the stop ring 205 relative to the first arm 114. The stop surfaces can be configured and reconfigured to control the angle of rotation between the first arm 114 and the second arm 116 depending on the direction of the rotation between arms. Reconfiguring the location of stop surfaces can be useful for changing the orientation of the workstation from the extended orientation (e.g., away from the structure interface 112 as illustrated in FIG. 1) to the stowed orientation (e.g., close to the structure interface 112 as illustrated in FIG. 2).

Figure 18A:
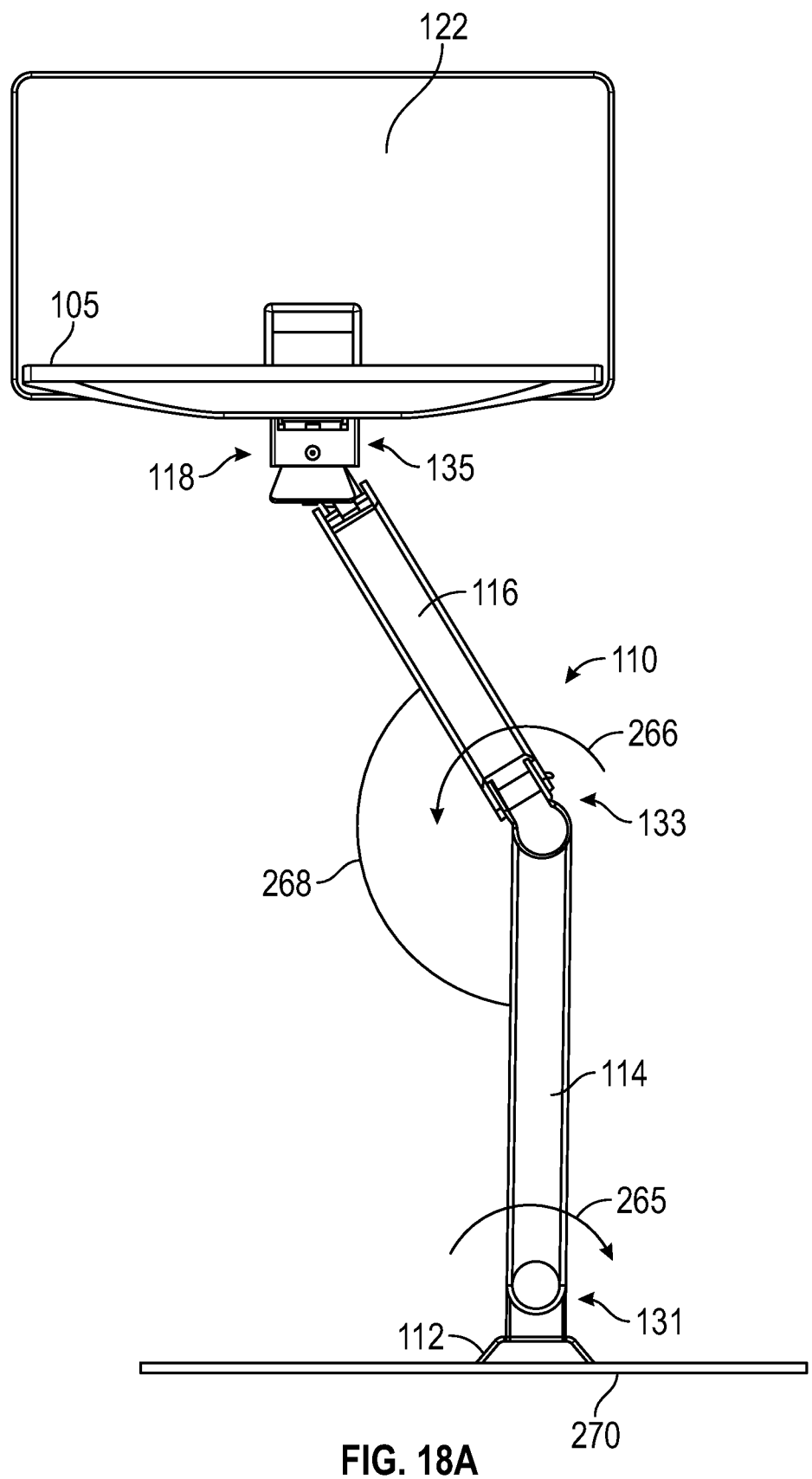
FIG. 18A is a top view of the workstation of FIG. 1 in an extended orientation.
Figure 18B:
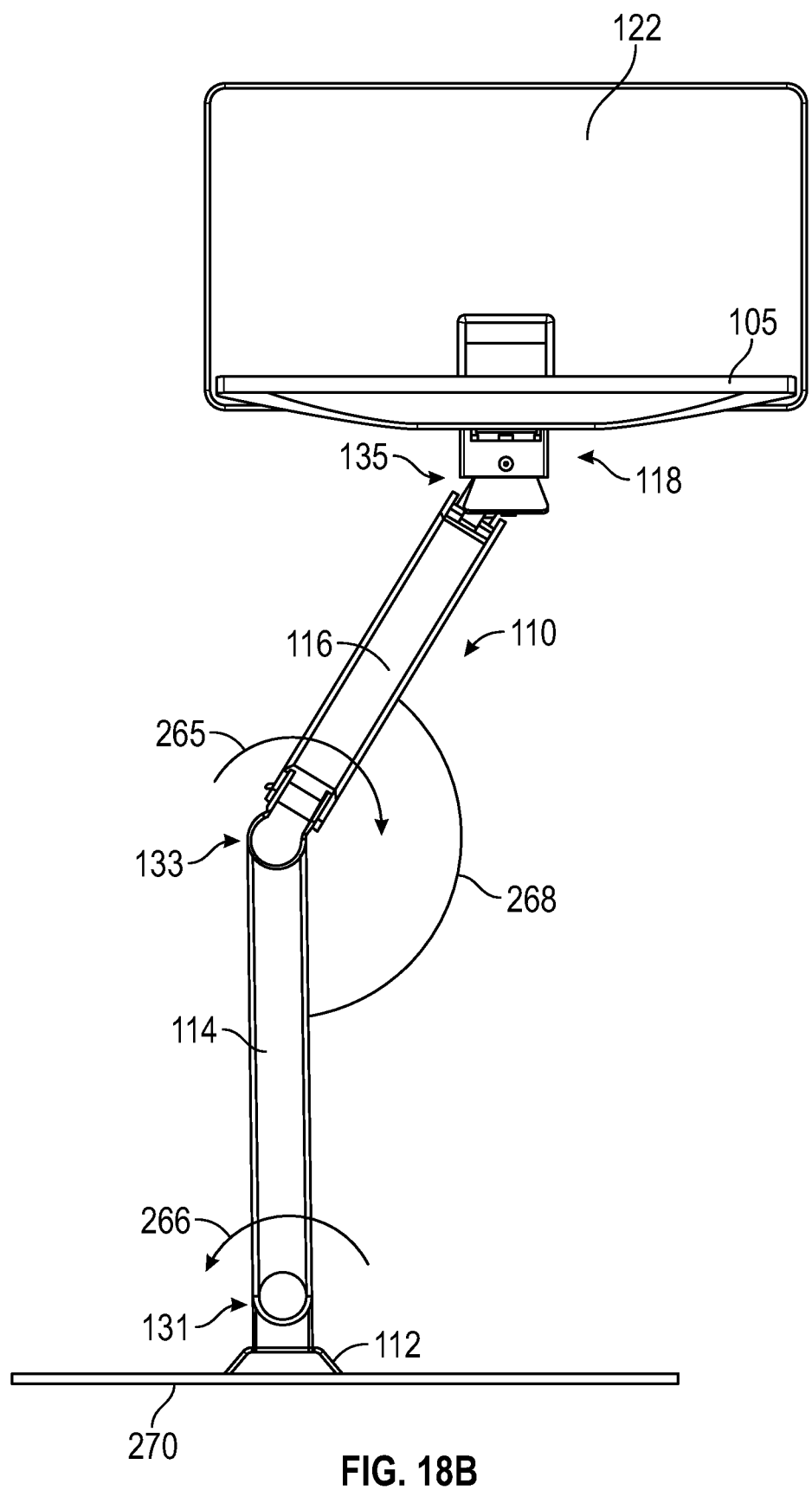
FIG. 18B is a top view of the workstation of FIG. 1 in an extended orientation.
Figure 19A:
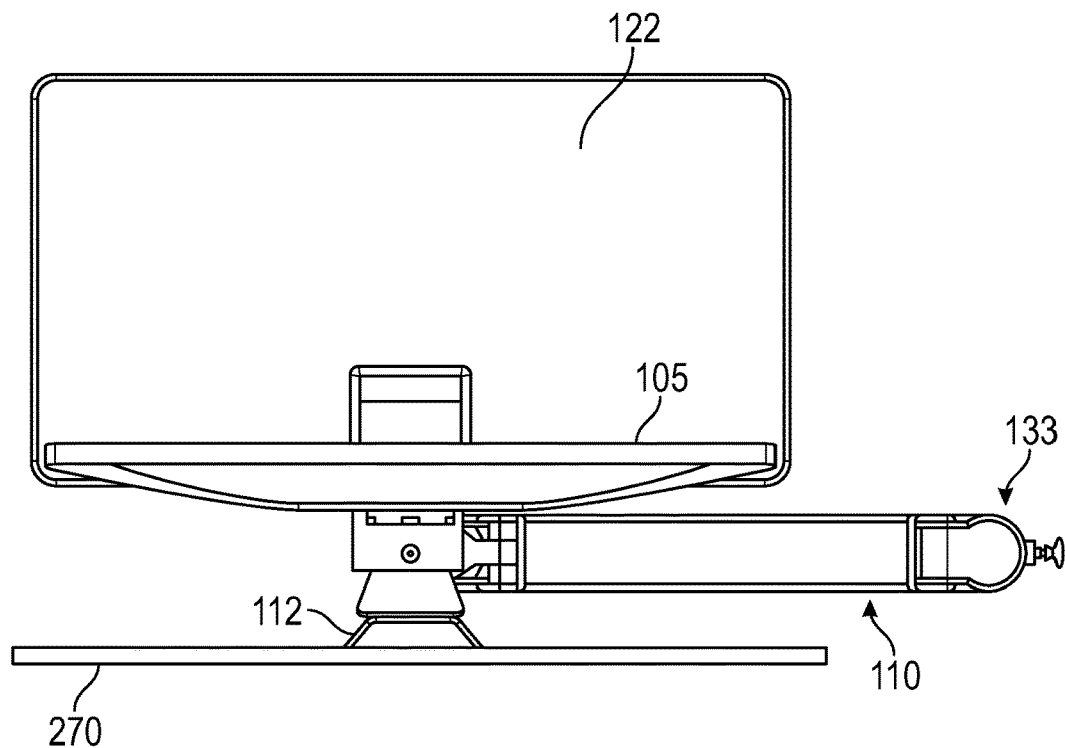
FIG. 19A is atop view of the workstation of FIG. 18A in a stowed orientation.
Figure 19B:
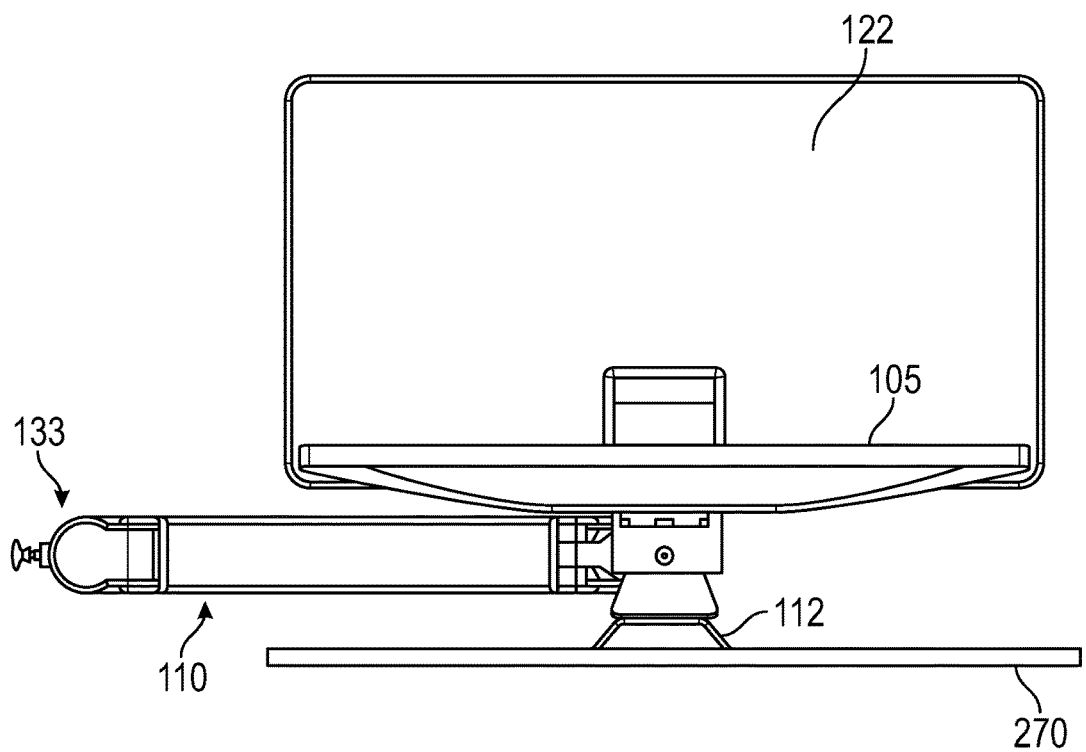
FIG. 19B is a top view of the workstation of FIG. 18B in a stowed orientation.

FIGS. 18A-18B are the top views of the workstation 100 of FIG. 1 in extended orientations, and FIGS. 19A-19B are the top views of the workstation of FIG. 1 in stowed orientations according to some example configurations of the current disclosure. In some example configurations, the structure interface can be coupled to a wall 270.

The workstation 100 can be translated between the stowed configuration and the extended configuration, or between the extended configuration and the stowed configuration differently (e.g., arms can rotate in different directions) depending on which side of the structure interface 112 the arm assembly 110 is desired to be located in the stowed configuration (e.g., on the right side as illustrated in FIG. 19A or on the left side as illustrated in FIG. 19B). The bi-directional stop assembly 115 can be useful to control the arm rotation in either direction.

In some example configurations, the workstation (e.g., the workstation of FIG. 18A) can be configured such that, in order to translate the workstation 100 to a stowed orientation shown in FIG. 19A, the first arm 114 can be configured to rotate relative to the structure interface 112 in a first direction 265 (e.g., in a clockwise direction) and the second arm 116 can be configured to rotate relative to the first arm 114 in a second direction 266 opposite the first direction 265 (e.g., in a counter-clockwise direction). Similarly, to translate the workstation 100 from stowed orientation shown in FIG. 19A to the extended orientation shown in FIG. 18A, the first arm 114 and the second arm 116 can rotate in opposite directions of the first direction 265 and the second direction 266 relative to the structure support and the first arm 114, respectively.

In other example configurations, the workstation (e.g., the workstation of FIG. 18B) can be configured such that, in order to translate the workstation 100 to a stowed orientation shown in FIG. 19B, the first arm 114 can be configured to rotate relative to the structure in a second direction 266 (e.g., in a counter-clockwise direction) and the second arm 116 can be configured to rotate relative to the first arm 114 in a first direction 265 opposite the second direction 266 (e.g., in a clockwise direction). Similarly, to translate the workstation 100 from stowed orientation shown in FIG. 19B to the extended orientation shown in FIG. 18B, the first arm 114 and the second arm can rotate in opposite directions of the second direction 266 and the first direction 265 relative to the structure support and the first arm 114, respectively.

In some example configurations, an extended angle 268 can be allowed between the first arm 114 and the second arm 116 (e.g., the extended angle 268 of FIG. 18A, or the extended angle 268 of FIG. 18B). The extended angle can be less than 180 degrees (for example, 170 degrees, or less). The rotation stop surfaces (e.g., the first stop surface 228 and the second stop surface of FIG. 13) at the second hinge 133 can be configured to achieve the extended angle 268 on either the right or the left side of the first arm 114 depending on the rotation direction between the first arm 114 and the second arm while translating the workstation 100 from stowed orientation to the extended orientation.

Figure 20A:
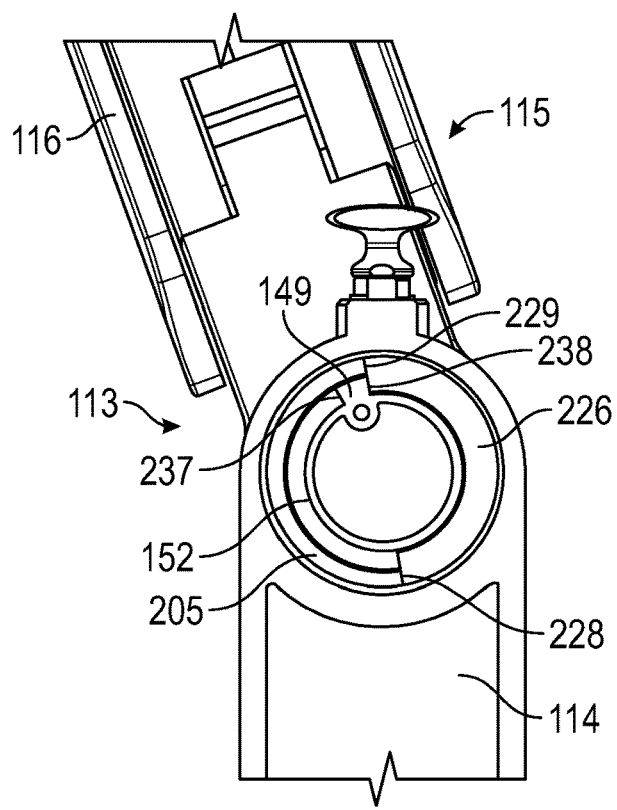
FIG. 20A is a bottom cross-sectional view of the second hinge of FIG. 18A in an extended orientation.
Figure 20B:
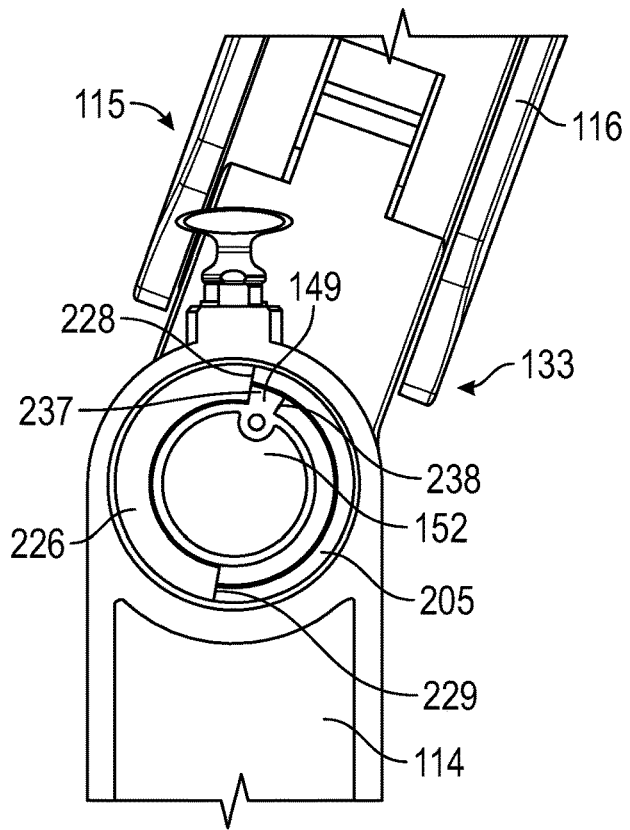
FIG. 20B is a bottom cross-sectional view of the second hinge of FIG. 18B in an extended orientation.

FIGS. 20A-20B are bottom cross-sectional views of the second hinge in an extended configuration according to some example configurations of the current disclosure. The rotation stop surfaces at the second hinge 133 can be configured by rotating the stop ring 205 relative to the first arm 114 and securing the stop ring 205 to the first arm 114 using the rotation stop assembly 115. FIG. 20A represents the orientation of the rotations stop surfaces to be used for translating the workstation 100 between the extended and stowed configurations shown in FIGS. 18A and 19A, respectively. The stop ring 205 can be configured to rotate relative to the first arm 114 such that the second lock hole of the stop ring 205 can be proximate the rotation stop assembly 115 and the second lock hole 232 can be concentric with the plunger 240 of the rotation stop assembly 115. The plunger 240 can engage with the second lock hole 232 to secure the stop ring 205 to the first arm 114. The first block shaft 152 of the second arm 116 and the boss 149 coupled to the first block shaft 152 can rotate between the first stop surface 228 and the second stop surface 229 of the stop ring 205. In an extended configuration (e.g., the second arm 116 can rotate relative to the first arm 114 to achieve the max extended angle of FIG. 18A), the second side 238 of the boss 149 can contact the second stop surface 229 of the stop ring 205. In the stowed configuration of FIG. 19A (e.g., the first arm and the second arm 116 can overlap), the second arm 116 can be rotated in counterclockwise direction relative to the first arm 114 such that the first side of the boss 149 can contact the first stop surface 228 of the stop ring 205.

FIG. 20B represents the orientation of the rotations stop surfaces to be used for translating the workstation 100 between the extended and stowed configurations shown in FIGS. 18B and 19B, respectively. The stop ring 205 can be configured to rotate relative to the first arm 114 such that the first lock hole 231 of the stop ring 205 can be proximate the rotation stop assembly 115 and the first lock hole 231 can be concentric with the plunger 240 of the rotation stop assembly 115. The plunger 240 can engage with the first lock hole 231 to secure the stop ring 205 to the first arm 114. The first block shaft 152 of the second arm 116 and the boss 149 coupled to the first block shaft 152 can rotate between the first stop surface 228 and the second stop surface 229 of the stop ring 205, In an extended configuration (e.g., the second arm 116 can rotate relative to the first arm 114 to achieve the max extended angle of FIG. 18B), the first side 237 of the boss 149 can contact the first stop surface 228 of the stop ring 205. In the stowed configuration of FIG. 19A (e.g., the first arm 114 and the second arm 116 can overlap), the second arm 116 can be rotated in clockwise direction relative to the first arm 114 such that the second side 238 of the boss can contact the second stop surface 229 of the stop ring 205.

Figure 21:
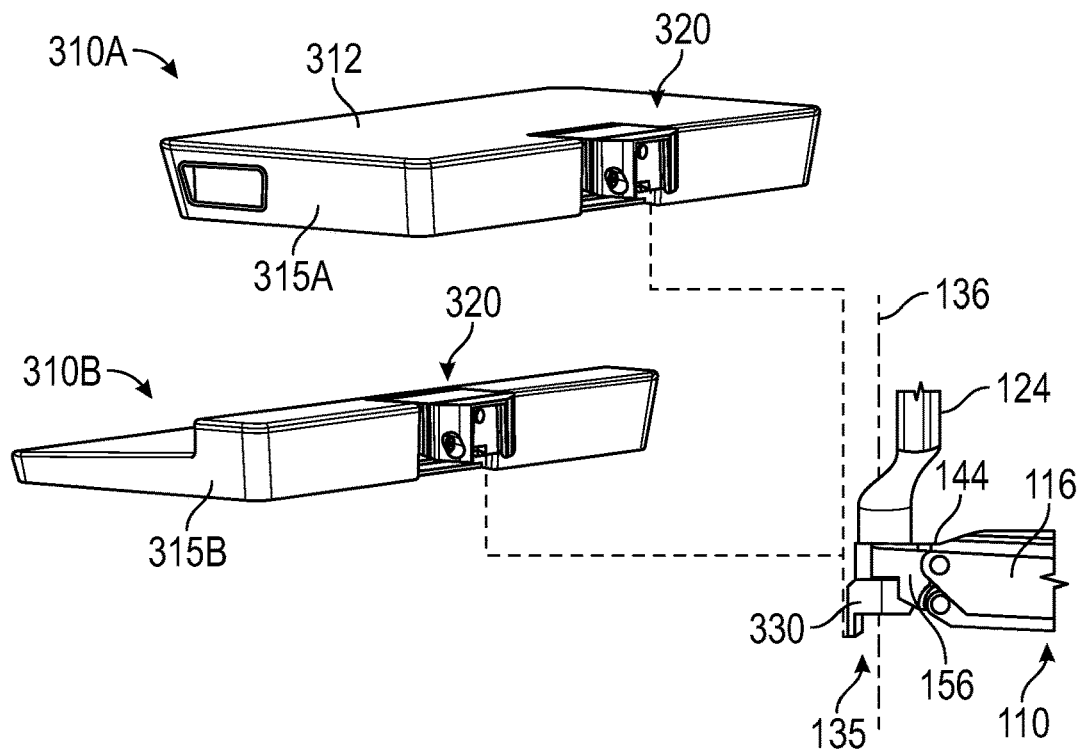
FIG. 21 is an exploded view of the platform and the arm assembly of FIGS. 1 and 3A.

FIG. 21 illustrates the exploded view of a platform 310 and an arm assembly (e.g., arm assembly 110 of FIG. 1) according to an example configuration of the current disclosure. The platform 310 can be coupled to an end of a height adjustable arm (e.g., the second end 144 of the second arm 116 of the arm assembly 110 of FIG. 4). The platform 310 can be built in different configurations. In some example configurations, the platform 310 can have a worksurface 312 (e.g., the platform 310A of FIG. 21) and a slide-out keyboard tray (not shown in FIG. 21) can be coupled to the support tray 315A below the worksurface 312. In other example configurations, the platform 310 can be built without a worksurface (e.g., the platform 310B of FIG. 21) and the keyboard tray can be placed directly on to the support tray 315B. In either one of these example configurations, an interface assembly 320 can be coupled to the rear end of the platform 310 proximate to its center. The interface assembly 320 can be configured to quickly couple the platform 310 to the arm assembly 110.

Figure 22:
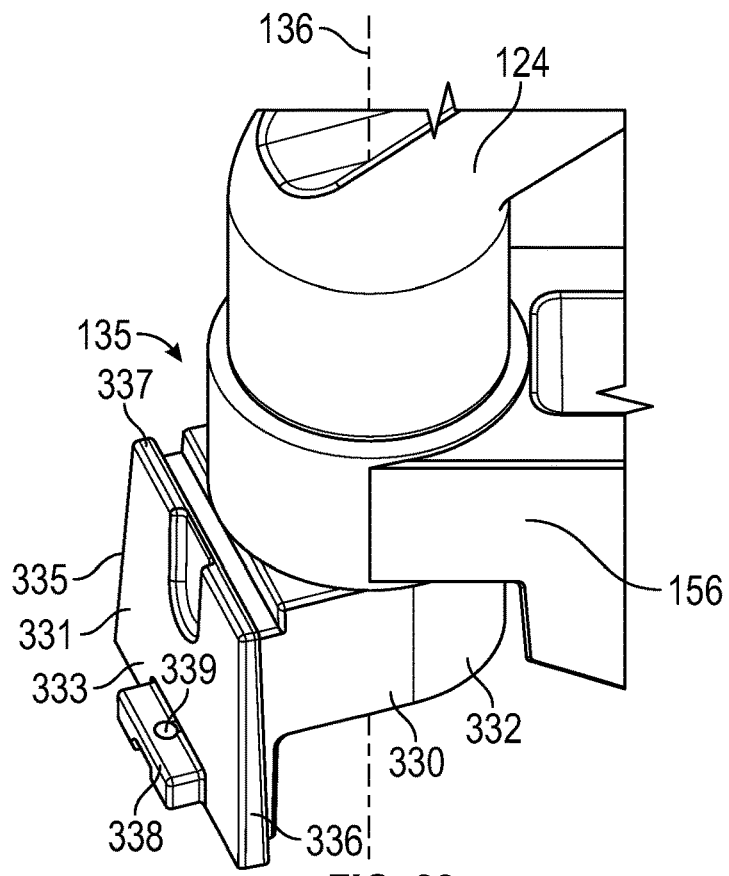
FIG. 22 is a close-up view of the third hinge at the end of the height adjustable arm of FIG. 4.

FIG. 22 is a close-up view of the third hinge 135 located proximate an end of the height adjustable arm (for example, the second end 144 of the second arm 116 of FIG. 4). A second block 156 can be located at the second end 144 of the second arm 116. The second block 156 can be coupled to the second arm on one end and it can hold the third hinge 135 on the other end. A support column 124 can be coupled to the second block 156 above an upper surface of the second block 156, and a connection block 330 can be coupled to the second block 156 below a lower surface of the second block 156. Both the support column 124 and the connection block 330 can rotate around a third axis 136 relative to the second block 156. The third axis 136 can be defined by the third hinge 135.

The connection block 330 can have a first end 331 and a second end 332. The connection block 330 can be rotatingly coupled to the second block 156 proximate the second end 332, and a connection block face 333 can be formed proximate the first end 331. A first key 335 having a first key profile (e.g., a cone, protrusion, or the like) and a second key 336 having a second key profile (e.g., a cone, protrusion, or the like) can be formed on the right and left edges of the connection block face 333, respectively. The first key 335 and the second key can have a slight taper from a first end to a second end of the first key and the second key. A ridge 337 and a tab 338 can be formed proximate the upper edge and the lower edge of the connection block face 333, respectively. An aperture 339 can be formed on the tab 338.

Figure 23:
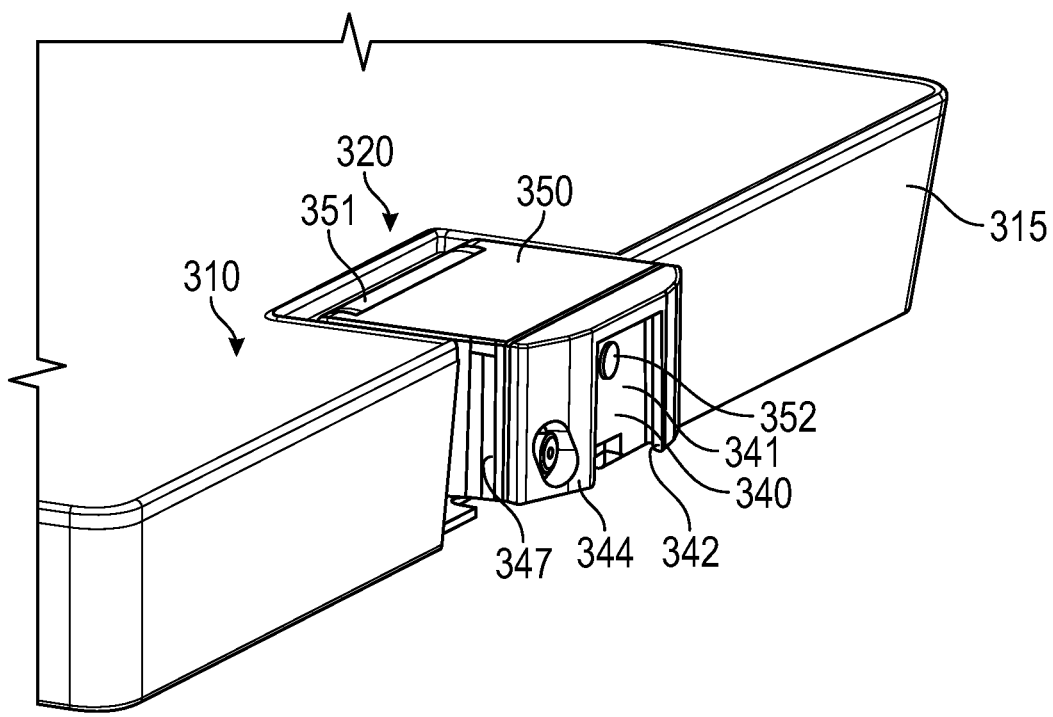
FIG. 23 is a close-up perspective view of the rear end of the support tray of FIG. 21.

FIG. 23 is a close-up perspective view of the rear end of the support tray 315. An interface assembly 320 can be coupled to the support tray 315 proximate to its center. The interface assembly 320 can include an interface bracket 340 and a carrier block 350. The carrier block 350 can be adapted to hold the support tray 315. In some example configurations, the interface assembly 320 can further include a platform leveling hinge 352. The carrier block 350 can be rotatingly coupled to the interface bracket 340 at the platform leveling hinge 352.

Figure 24:
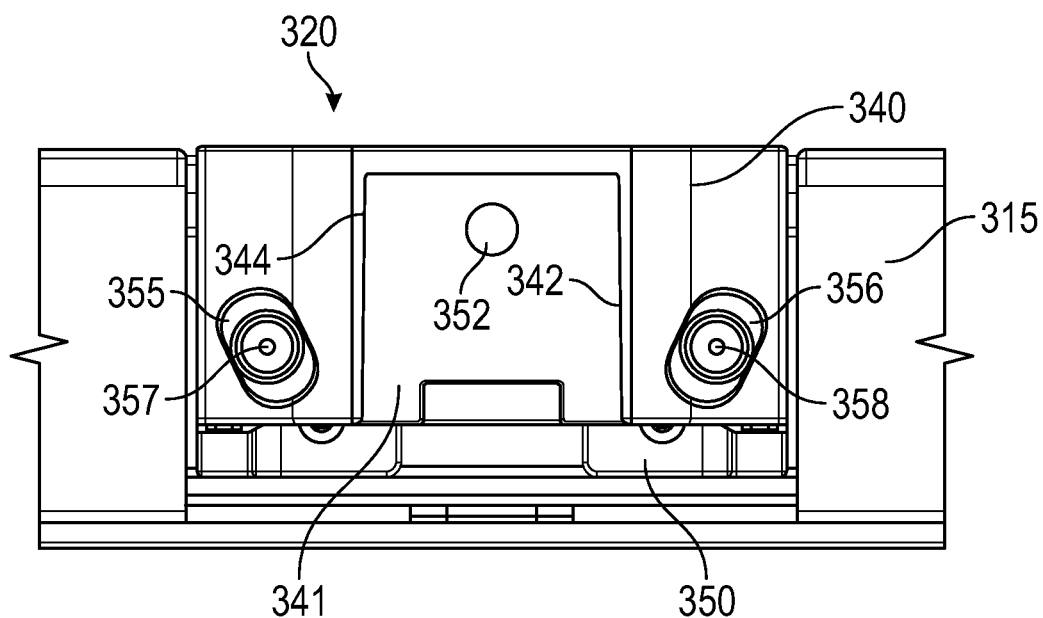
FIG. 24 is a close-up rear view of the interface assembly of FIG. 23.

FIG. 24 shows a close-up rear view of the interface assembly 320. The interface assembly 320 can include a first curved slot 355 and a second curved slot 356 which can be formed on the interface bracket 340. The first curved slot and the second curved slot 356 can be in a circular shape, and they can be concentric with the platform leveling hinge 352. A first and a second threaded holes (not shown in FIG. 24) can be defined in the carrier block 350. A first fastener 357 and a second fastener 358 can be inserted through the first curved slot 355 and the second curved slot 356, respectively. The first and the second threaded holes can receive the first and the second fasteners, respectively, to couple the carrier block 350 and the interface bracket 340. The carrier block 350 can be adapted to rotate around the platform leveling hinge 352 relative to the interface bracket 340 to level the support tray 315. Once the leveling of the support tray is completed, the first and the second fasteners can be tightened to prevent further rotation of the carrier block relative to the interface bracket.

The interface bracket 340 can include an interface bracket opening 341 proximate to its center. The interface bracket opening 341 can be located on a rear wall of the interface bracket 340 facing away from the carrier block 350. A first keyway 342 having a first keyway profile and a second keyway 344 having a second keyway profile can be formed on a first side and a second side of the interface bracket opening 341, respectively. The first keyway profile and the second keyway profile can correspond to the first key profile and the second key profile, respectively.

The interface bracket opening 341 can be sized and shaped to receive the connection block 330. In an assembled configuration (e g., workstation 100 assembly of FIG. 1), the first end 331 of the connection block 330 can be inserted into the interface bracket opening 341. The first key 335 and the second key 336 can be configured to engage with the first keyway 342 and the second keyway 344, respectively, to mate the interface bracket 340 with the connection block 330. A threaded hole (not shown on FIG. 24) can be defined in the interface bracket 340, and a fastener (not shown on FIG. 24) can be inserted through the aperture 339 and engage with the threaded hole located on the interface bracket to inhibit translation of the first and second keys within the first and second keyways and couple the interface bracket 340 with the connection block 330.

Figure 25:
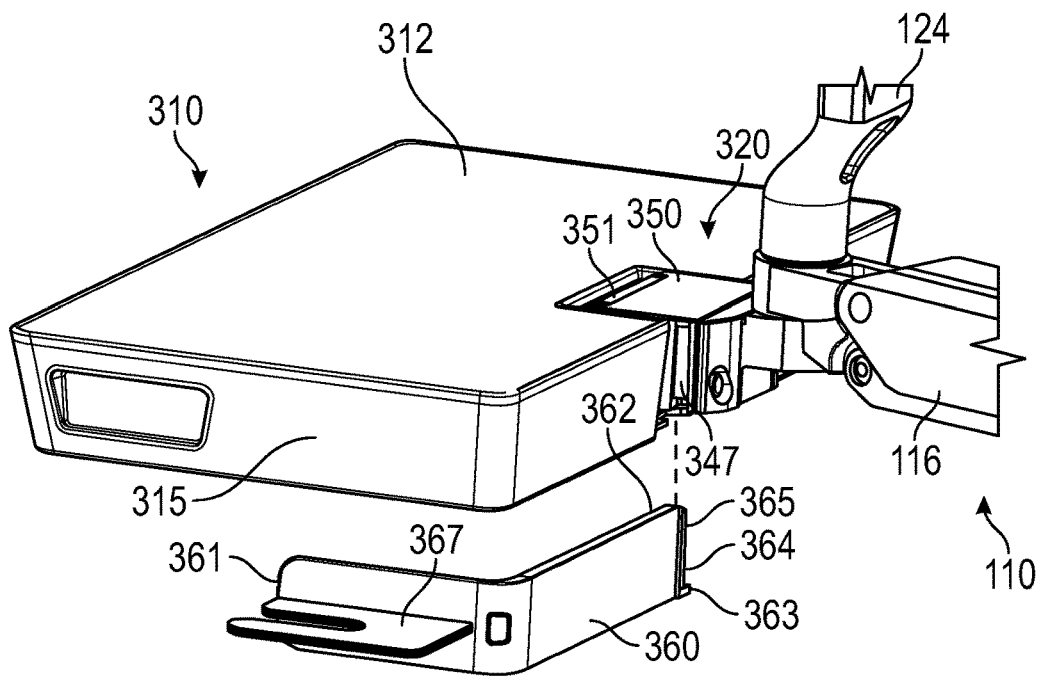
FIG. 25 is a rear perspective view of the platform and the interface assembly of the workstation of FIG. 1 together with an accessory holder bracket.

FIG. 25 is a rear perspective view of the platform 310 and the interface assembly 320 of a workstation (e.g., the workstation 100 of FIG. 1). The workstation 100 can further include an accessory holder bracket 360. In some example configurations, the accessory holder bracket 360 can be formed in an L-shape as illustrated in FIG. 25. The accessory holder bracket can have a first end 361 and a second end 362.

An accessory support 367 (e.g., a shelf a rack, a hook, or the like) can be coupled to the accessory holder bracket 360 proximate the first end 361, and an insert 363 can be coupled to the accessory holder bracket 360 proximate the second end 362. The insert 363 can be useful to couple the accessory holder bracket 360 to the carrier block 350. The accessory support can be useful to keep accessories (e.g., a scanner, a printer, or the like) by the support tray 315.

The insert 363 can include an insert body 364 and a third key 365 having a third key profile (e.g., a cone, protrusion, or the like). The third key 365 can extend from the insert body 364. The third key 365 can have a slight taper from a first end to a second end of the third key 365. In some example configurations, the insert 363 can be formed as an integral part of the accessory holder bracket 360.

A third keyway 347 can be formed on the side wall of the carrier block as illustrated in FIG. 25. The third keyway 347 can have a third keyway profile which can at least partially correspond to the third key profile. The third key 365 can be configured to engage with the third keyway 347 to mate the accessory holder bracket 360 with the carrier block 350. In some example configurations, the third keyway 347 can be formed on one or both sides of the carrier block 350, and the accessory holder bracket 360 can be coupled to the carrier block 350 on one or both sides of the carrier block 350.

Figure 26:
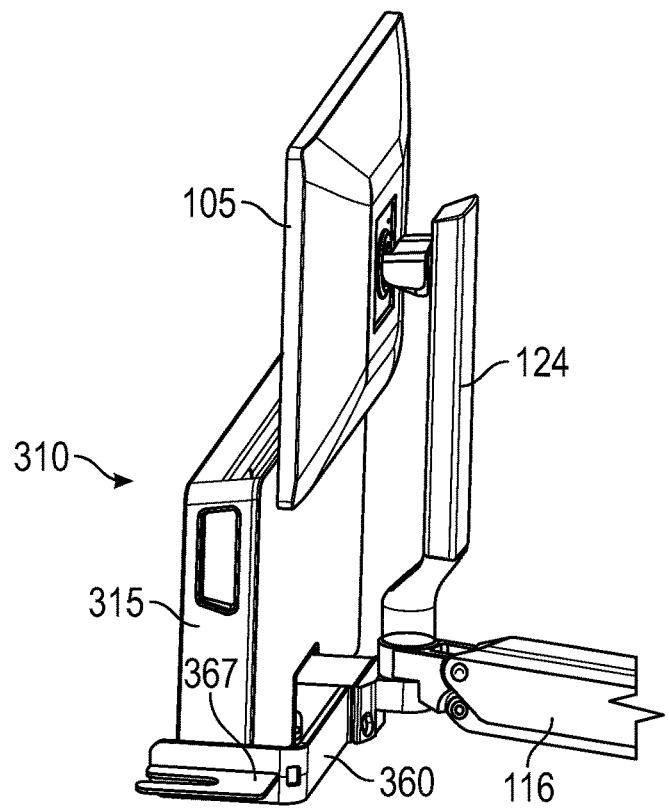
FIG. 26 illustrates the workstation of FIG. 1 in a folded configuration of the support tray.

A threaded hole (not shown in FIG. 25) can be defined in the third keyway 347, and an aperture (not shown in FIG. 25) can be formed on the third key 365. In an assembled configuration as illustrated in FIG. 26, a fastener (not shown in FIG. 26) can be inserted through the aperture located on the third key 365 and engage with the threaded hole located on the third keyway to inhibit translation of the third key 365 within the third keyway 347 and couple the accessory holder bracket 360 with the carrier block 350.

In some example configurations, the carrier block 350 of the interface assembly 320 can further include a platform tilt hinge 351. The support tray 315 can be rotatingly coupled to the carrier block 350 at the platform tilt hinge 351. The platform tilt hinge 351 can define a substantially horizontal rotation axis. The support tray 315 can be rotated around the horizontal rotation axis towards the electronic display 105 to reduce the footprint of the workstation 100 when it is not in use, Since the accessory holder bracket 360 is coupled to the carrier block 350 away from the support tray 315, when the support tray is rotated towards the display as illustrated in FIG. 26, the accessory holder bracket 360 and the accessory support 367 can be stationary allowing any accessories (e.g., scanner, or the like) coupled to the accessory support 367 stay steady.

Figure 27:
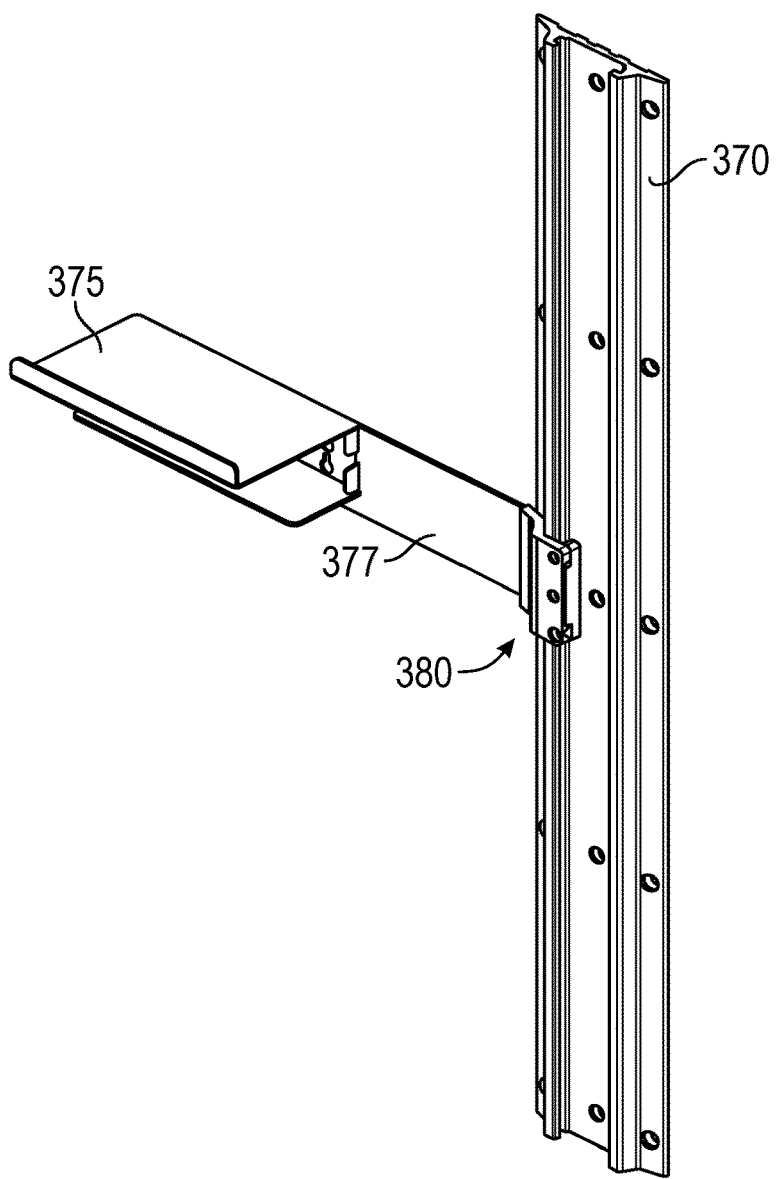
FIG. 27 shows a perspective view of a support bracket and a support rack mounted on a wall track with a clamp assembly.
Figure 28:
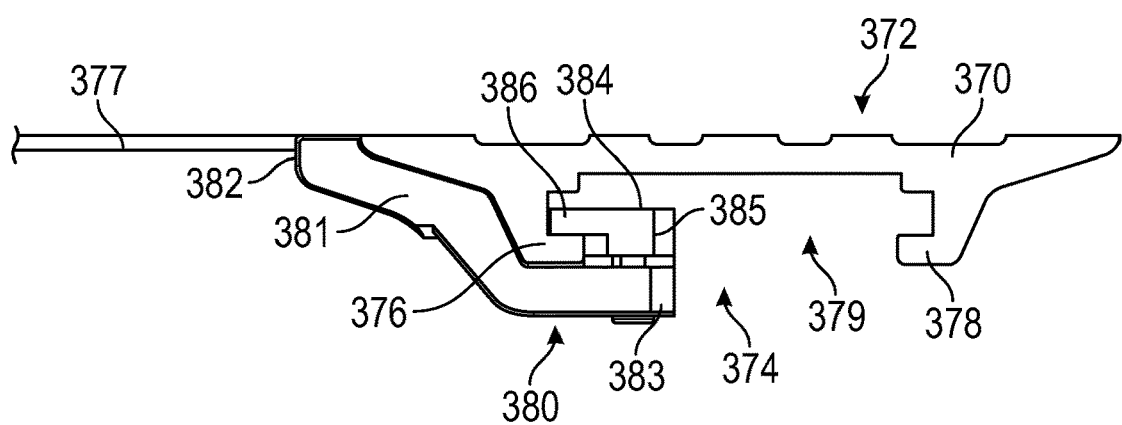
FIG. 28 is a top view of the wall track and a clamp assembly of FIG. 27.

FIG. 27 shows a perspective view of a support bracket 377 mounted to a wall track 370 according to an example configuration of the current disclosure. The wall track can be an elongated component. A cross-section of the wall track is shown in FIG. 28 according to an example configuration of the current disclosure. The wall track 370 can be made of a known engineering material including (but not limited to) an extruded aluminum, bent sheet metal, cast aluminum, or the like.

In some example configurations, one or more additional support brackets (not shown) can be mounted to the wall track 370 on one or both sides. A clamp assembly 380 can be coupled to the support bracket 377 and coupled to the wall track 370 to mount the support bracket on to the wall track. One or more accessory supports 375 (e.g., a rack, a shelf, a hook, or the like) can be coupled to the support bracket 377 to hold one or more accessories (e.g., scanners, printers, or the like) proximate to the wall track 370, FIG. 28 is a top view of the coupling between the wall track 370 and the support bracket 377 thorough the clamp assembly 380. The wall track 370 can have a back side 372 and a front side 374. The back side of the wall track can be coupled to a structure (e.g., a wall), and the front side of the wall track can include a wall track opening 379. A first edge 376 and a second edge 378 can be formed on the right side and the left side of the wall track opening 379, respectively. The first edge 376 and the second edge 378 can be used to couple one or more components (e.g., arm assembly, support bracket, or the like) to the wall track 370.

The clamp assembly 380 can include a clamp base 381 and a clamp insert 384. The clamp base 381 can be located in front of the wall track 370, and it can at least partially conform to the shape of the wall track. The clamp base 381 can have a first end 382 and a second end 383. The first end 382 of the clamp base can be located proximate a side of the wall track 370 and the support bracket can be coupled to the first end 382. The second end 383 of the clamp base can extend towards the wall track opening 379 (e.g., extend beyond the first edge 376 and at least partially overlap with the wall track opening 379). The clamp base 381 can further include a clamp hinge 387 and a slotted hole 389 proximate the second end 383. The clamp hinge 387 can be located proximate an upper end, and the slotted hole 389 can be located proximate a lower end of the clamp base 381.

The clamp insert 384 can include a clamp insert body 385 and a clamp insert tip 386 as illustrated in FIG. 28 according to an example configuration of the current disclosure. The clamp insert tip 386 can extend out from the clamp insert body 385 in a transverse direction. The clamp insert 384 can be rotatingly coupled to the clamp base 381 at the clamp hinge 387 proximate to one end, and a clamp screw 388 can be threadingly engaged with the clamp insert 384 proximate to the other end.

Figure 29:
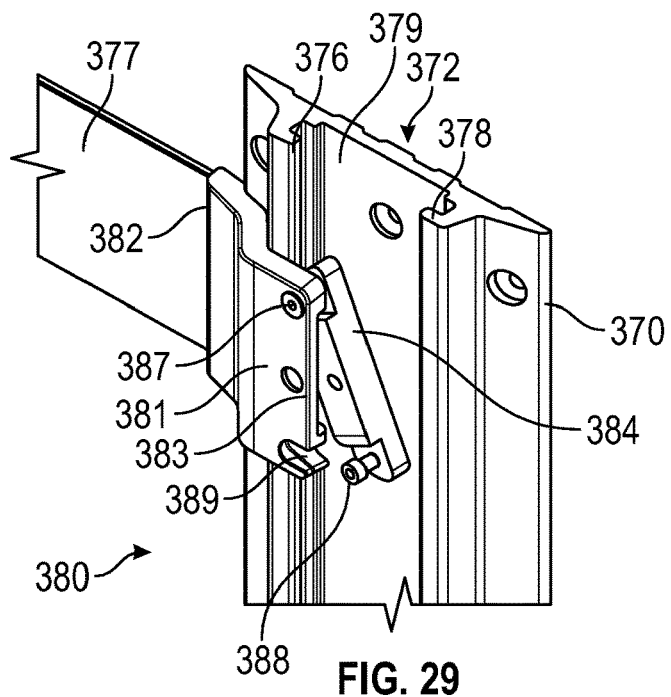
FIG. 29 is a perspective view of the clamp assembly of FIG. 27 inserted into the wall track opening.
Figure 30A:
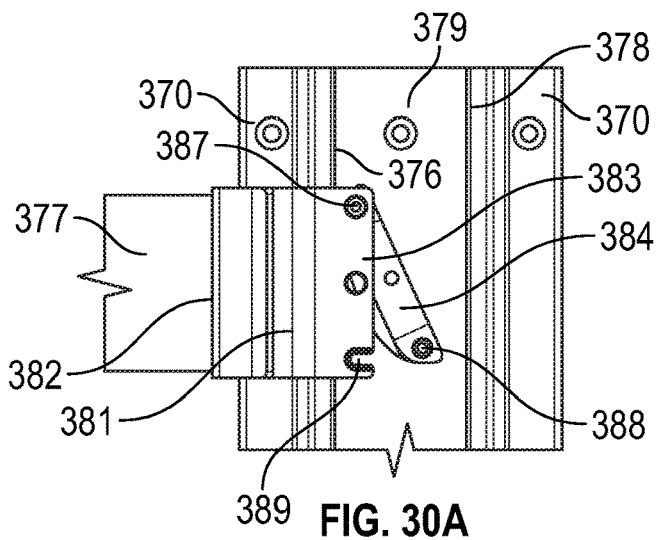
FIG. 30A is a front view of the clamp assembly of FIG. 29 inserted into the wall track opening.
Figure 30B:
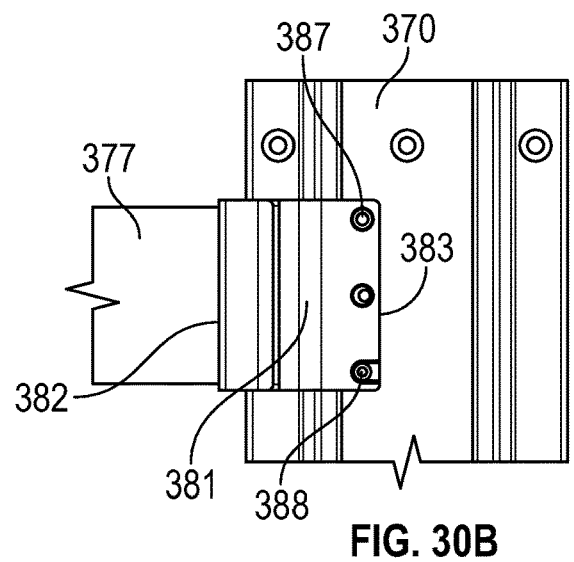
FIG. 30B is a front view of the clamp assembly of FIG. 29 inserted into the wall track opening at a clamped configuration.

In an assembled configuration, the clamp insert 384 can be slightly angled relative to the clamp base 381 and it can be inserted into the wall track opening 379 as illustrated in FIGS. 29-30A according to an example configuration of the current disclosure. Once located inside the wall track opening 379, the clamp insert 384 can be rotated around the clamp hinge 387 such that the clamp insert tip 386 can be at least partially located behind an edge (e.g., the first edge 376) of the wall track 370, and the clamp screw 388 can be located inside the slotted hole 389 as illustrated in FIG. 30B. The clamp screw can be tightened to clamp an edge of the wall track 370 (e.g., the first edge 376) between the clamp base 381 and the clamp insert tip 386 to securely couple the support bracket 377 to the wall track 370.

Figure 31:
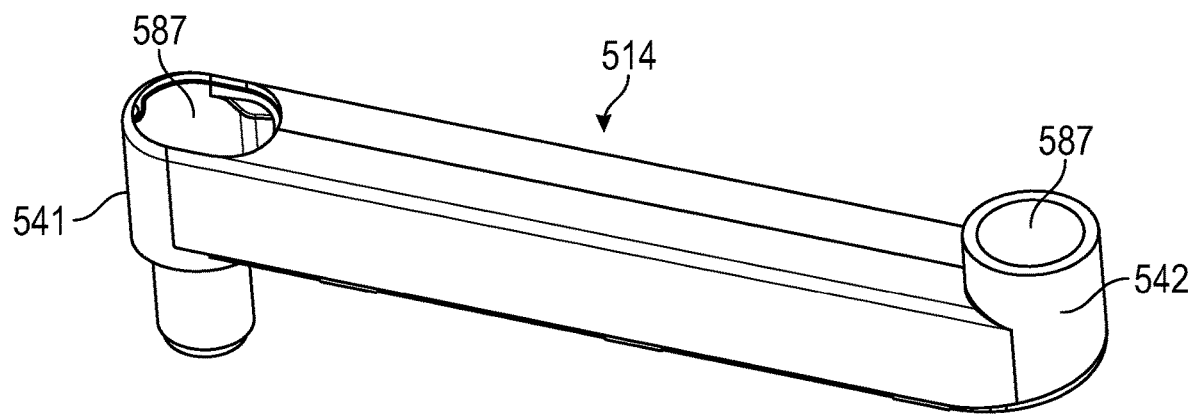
FIG. 31 is a perspective view of the extension arm according to an example configuration of the current disclosure.

FIG. 31 is a perspective view of a first arm 514 according to an example configuration of the current disclosure. The first arm 514 of FIG. 31 can be similar to the first arm 114 of FIG. 1. However the first arm 514 can be constructed differently to facilitate a different pan stop between the first arm 514 and the second arm 116 as it will be apparent in the following sections.

The first arm 514 can be an elongated arm having a first end 541 and a second end 542. A second aperture 586 and a third aperture 587 can be built in to the second end 542 and the first end 541 of the first arm 514, respectively. The second aperture 586 can be in a round cross-section, and the second aperture 586 can be configured to receive the first block shaft 152.

Figure 32:
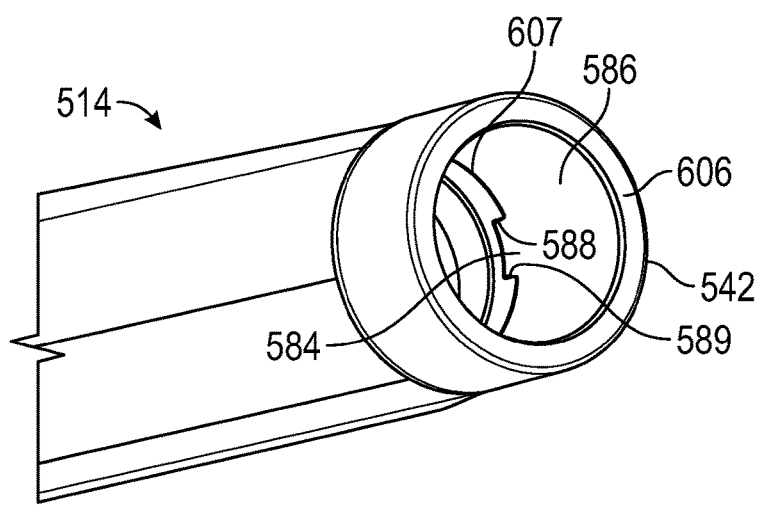
FIG. 32 is a partial perspective view of the extension arm of FIG. 31.

The second aperture 586 can be an elongated hole extending from an upper end 606 and a lower end 607. In some example configurations, a tab 584 can be formed on the first arm 514 proximate the lower end 607 as illustrated in FIG. 32. The tab 584 can be elongated radially along a portion of the second aperture 586. The tab 584 can include a first stop 588 and a second stop 589.

Figure 33:
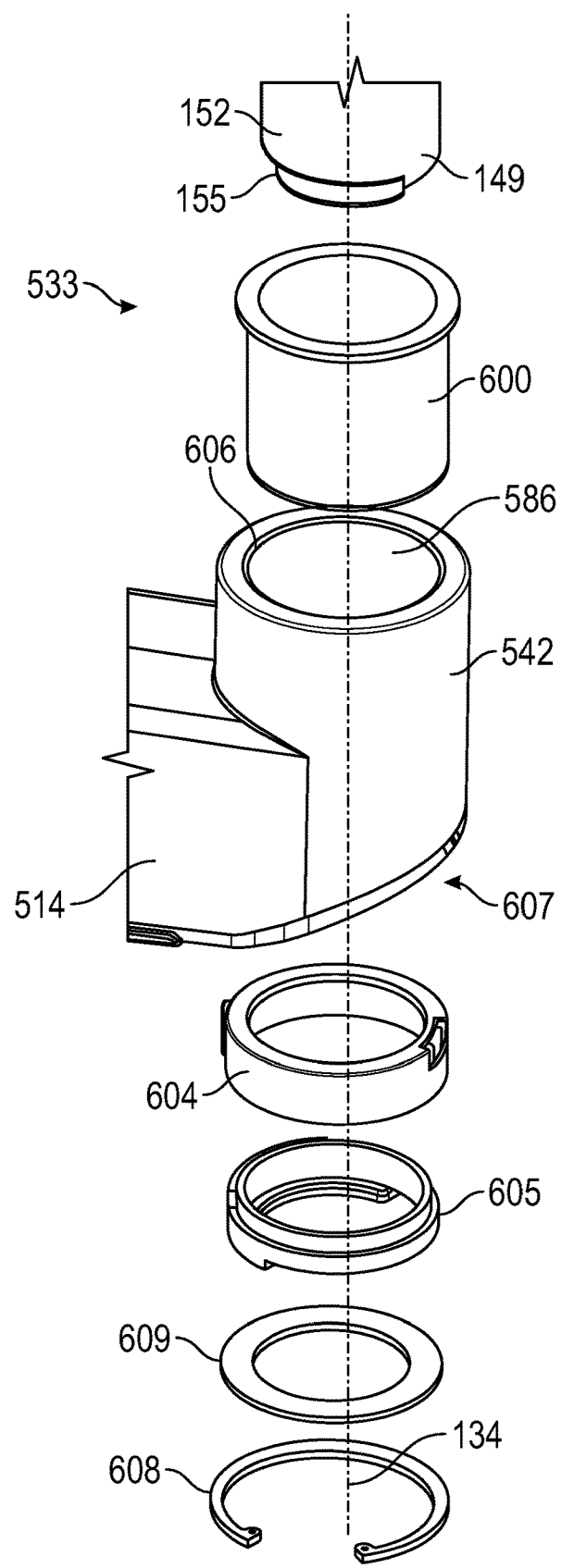
FIG. 33 is an exploded view of the second hinge according to an example configuration of the current disclosure.

FIG. 33 is an exploded view of a second hinge 533 according to an example configuration of the current disclosure. In the assembled configuration, the first block shaft 152 and the second aperture 586 can be coaxial, and their axis can coincide with a second axis 134. The second hinge 533 can include a first bushing 600. The first bushing 600 can be at least partially located inside the second aperture 586, and the first block shaft 152 can be at least partially located inside the first bushing 600.

The second hinge 533 can further include a second bushing 604 and a stop ring 605. The second bushing 604 and the stop ring 605 can be in circular cross-sections however several features can be formed on both the second bushing 604 and the stop ring 605 to enable a rotation immobilizing function between the first arm 514 and the second arm 116 at the second hinge 533 as it will be apparent in the below sections of this disclosure.

A washer 609 and a c-clip 608 can be coupled to the lower end 607 of the second aperture 586 to prevent the second bushing 604 and the stop ring 605 from dropping out of the second aperture 586.

Figure 34:
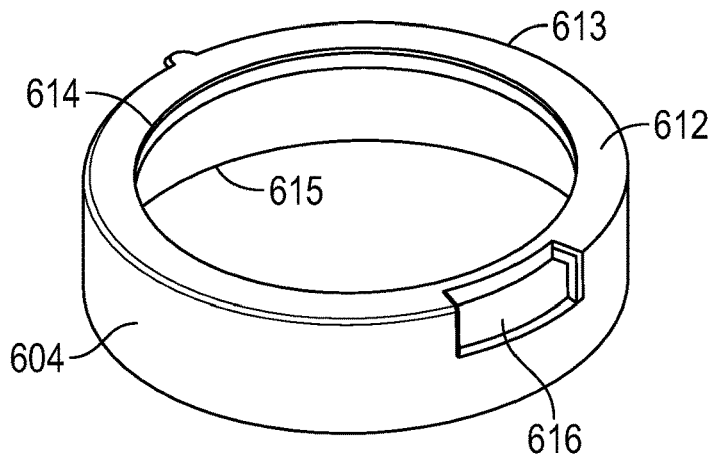
FIG. 34 is a perspective view of an example of a bushing.

FIG. 34 is a perspective view of the second bushing 604 according to an example configuration of the current disclosure. An outside diameter 613 of the second bushing 604 can be smaller than a diameter of the second aperture 586. The second bushing 604 can have a first inside diameter 614 proximate an upper end 612 and a second inside diameter 615. The second inside diameter 615 can be larger than the first inside diameter 614. The first inside diameter 614 can be larger than the first outside diameter 159 of the first block shaft 152. The first inside diameter 614 can be adapted to receive the first block shaft 152. The second bushing 604 can be inserted in to the second aperture 586 from the lower end 607 of the second aperture 586. The second bushing 604 at least partially located inside the second aperture 586. The second bushing 604 can be made of a non-metallic material (e.g., ABS, nylon, Delrin, Teflon, or the like).

An opening 616 can be formed on the second bushing 604 proximate the upper end 612. The opening 616 can be configured to receive the tab 584 when the second bushing 604 is inserted in to the second aperture 586. The tab 584 can be at least partially located inside the second bushing 604 when it is inserted into the opening 616. The second bushing 604 can be keyed to the first arm 514 through the tab 584. The second bushing 604 can be stationary relative to the first arm 514.

Figure 35:
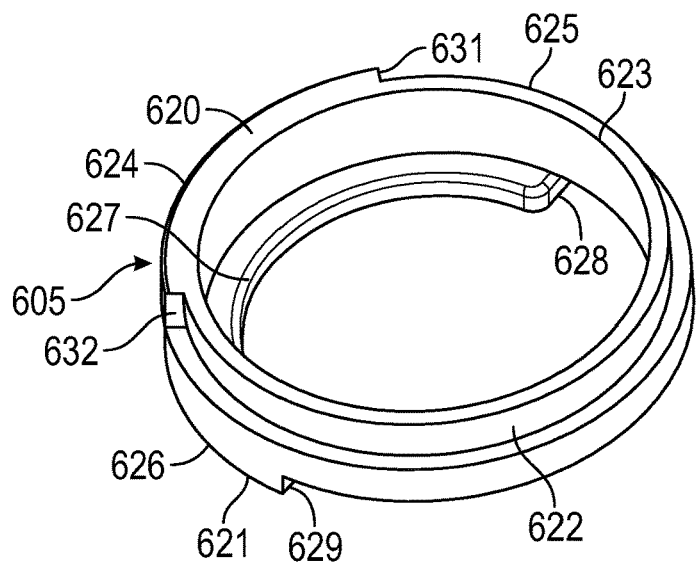
FIG. 35 is an upper perspective view of an example of a stop ring.
Figure 36:
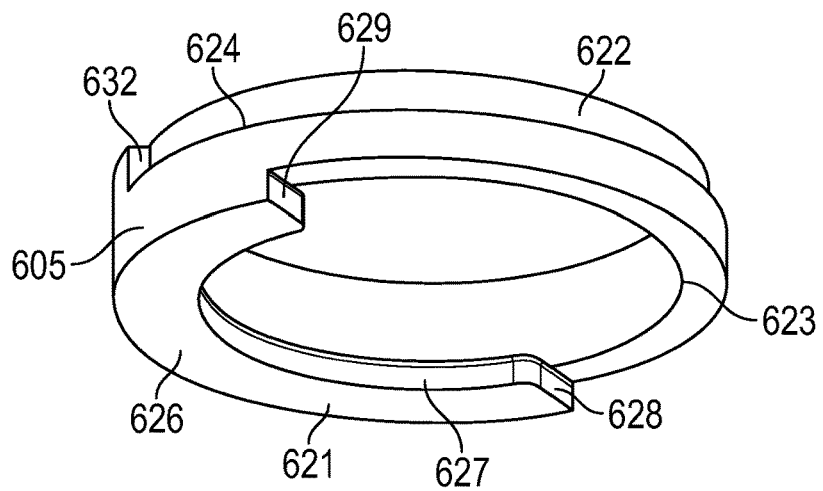
FIG. 36 is a lower perspective view of the stop ring of FIG. 35.
Figure 37:
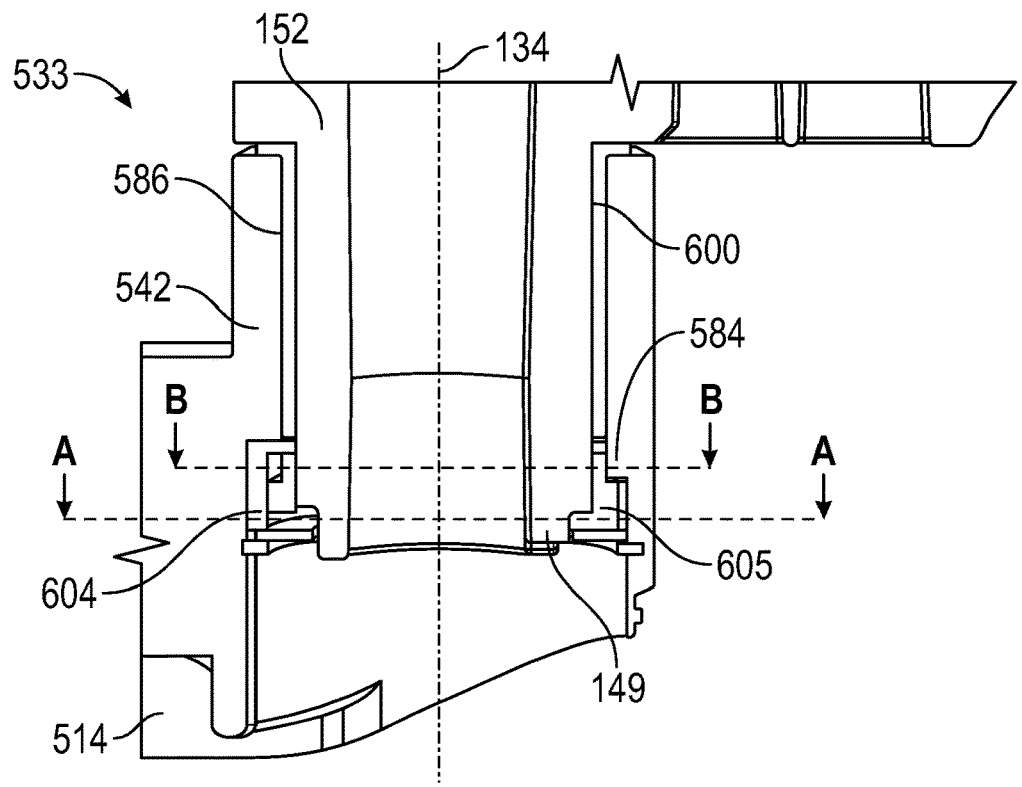
FIG. 37 is a cross-sectional side view of the second hinge of FIG. 33.
Figure 38:
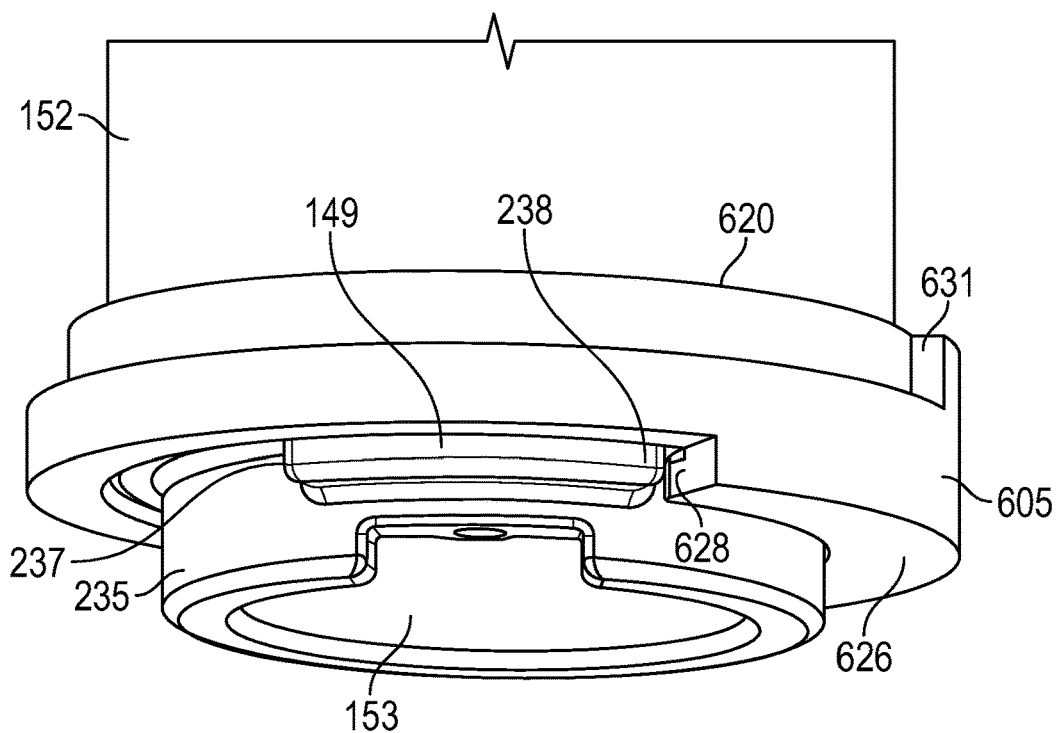
FIG. 38 is a partial perspective view of an example of a sub-assembly between a second arm and the stop ring of FIG. 35.

FIGS. 35-36 are an upper and a lower perspective views of the stop ring according to an example configuration of the current disclosure. The stop ring 605 can have an inside diameter 623 and an outside diameter 624. The inside diameter 623 can be larger than the first outside diameter 159 of the first block shaft 152. The inside diameter 623 can be adapted to receive the first block shaft 152. The outside diameter 624 can be smaller than the second inside diameter 615 of the second bushing 604. The stop ring 605 can be adapted to be inserted into the second bushing 604. The stop ring 605 can be at least partially located inside the second bushing 604, and the first block shaft 152 can be at least partially located inside the stop ring 605 as illustrated in FIG. 37.

The stop ring 605 can have an upper end 620 and a lower end 621. The stop ring 605 can further include a recessed section 622 covering at least a portion of the circumference of the stop ring 605 proximate to the upper end 620. The recessed section 622 can have a recessed section diameter 625 which can be smaller than the outside diameter 624 of the stop ring 605. A first edge 631 and a second edge 632 can be formed on the stop ring 205 proximate to the upper end 620. The first edge 631 and the second edge 632 can be located at the ends of the recessed section 622. The tab 584 can be at least partially located inside the recessed section 622. The tab 584 can cooperate with the first edge 631 and the second edge 632 to immobilize the rotation of the second arm 116 relative to the first arm 514 as it will be apparent in the following sections. The stop ring 605 can be made of any material known in engineering including, but not limited to, aluminum, ABS, nylon, steel, or the like.

The stop ring 605 can further include an overhung section 626 as illustrated in FIGS. 35-36, The overhung section 626 can be coupled to the lower end 621 of the stop ring 605. The overhung section 626 can have an outside diameter and an inside diameter 627. The outside diameter of the overhung section 626 can be the same as the outside diameter 624 of the stop ring 605. The inside diameter 627 of the overhung section 626 can be smaller than the inside diameter 623 of the stop ring 605. The inside diameter 627 can be larger than the second outside diameter 169 of the first block shaft 152. The inside diameter 627 of the overhung section 626 can be adapted to receive at least a portion of the second outside diameter 169 of the first block shaft 152.

The overhung section 626 can extend through a portion of the stop ring in circumferential direction, for example, the overhung section 626 can be located on one third, or one half, or any other ratio of the circumference of the stop ring 605. The overhung section 626 can include a first end 628 and a second end 629, The first end 628 and the second end 629 can be configured to cooperate with the first block shaft 152 to immobilize the rotation of the second arm 116 relative to the first arm 514 as it will be apparent in the following sections.

FIG. 37 is a cross-sectional view of the second hinge 533, and FIG. is a perspective view of the sub assembly between the first block shaft 152 and the stop ring 605 according to an example configuration of the current disclosure. The second bushing 604 can be inserted in to the second end 542 of the first arm 514. In the assembled configuration, the stop ring 605 can be inserted into the second bushing 604, and the first block shaft 152 can be inserted into the sub assembly of the first arm 514, the second bushing 604 and the stop ring 605. The first block shaft 152 can be at least partially located inside the second aperture 586, the second bushing 604 and the stop ring 605. The first block shaft 152, the second aperture 586, the second bushing 604, and the stop ring 605 can be concentric.

Figure 39A:
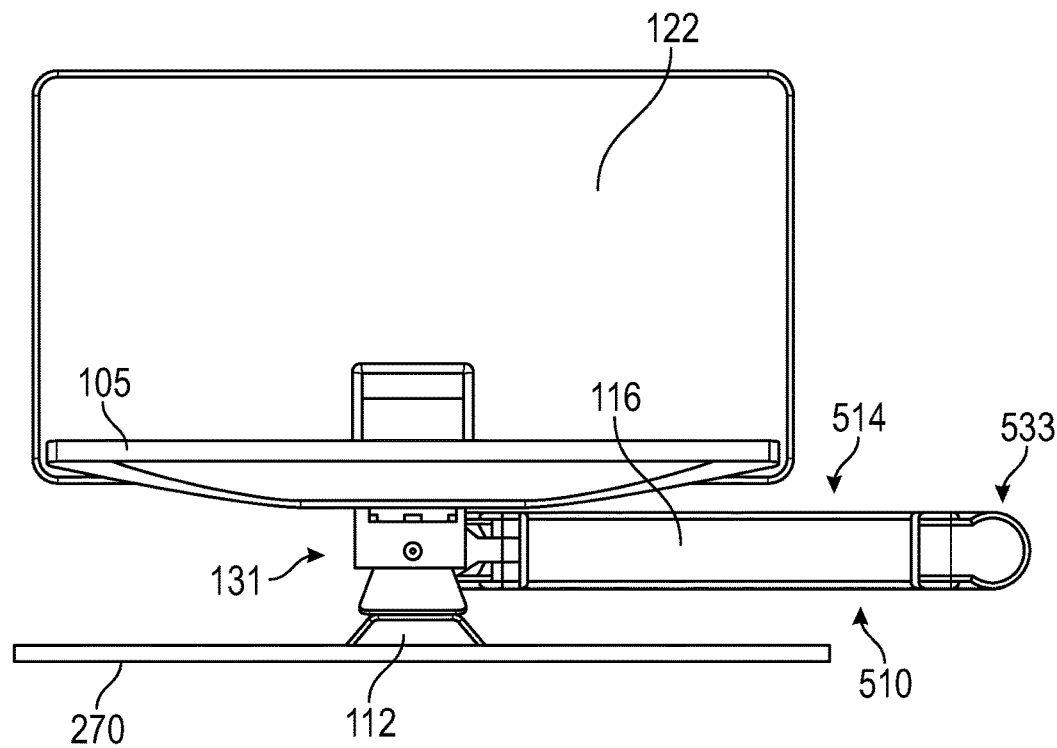
FIG. 39A is a top view of an example of a workstation in a stowed orientation.

FIG. 39A illustrates the top view of the arm assembly 510 in a first stowed configuration (e.g., stowed on the right side of the structure interface 112) according to an example configuration of the current disclosure. The arm assembly 510 can include a first arm 514 and a second arm 116. In the first stowed configuration, the first arm 514 can rotate in clockwise direction relative to the structure interface 112 at the first hinge 131, and the second arm 116 can rotate in counterclockwise direction relative to the first arm 514 at the second hinge 533. The second arm 116 can overlap with the first arm 514 in the first stowed configuration.

Figure 39B:
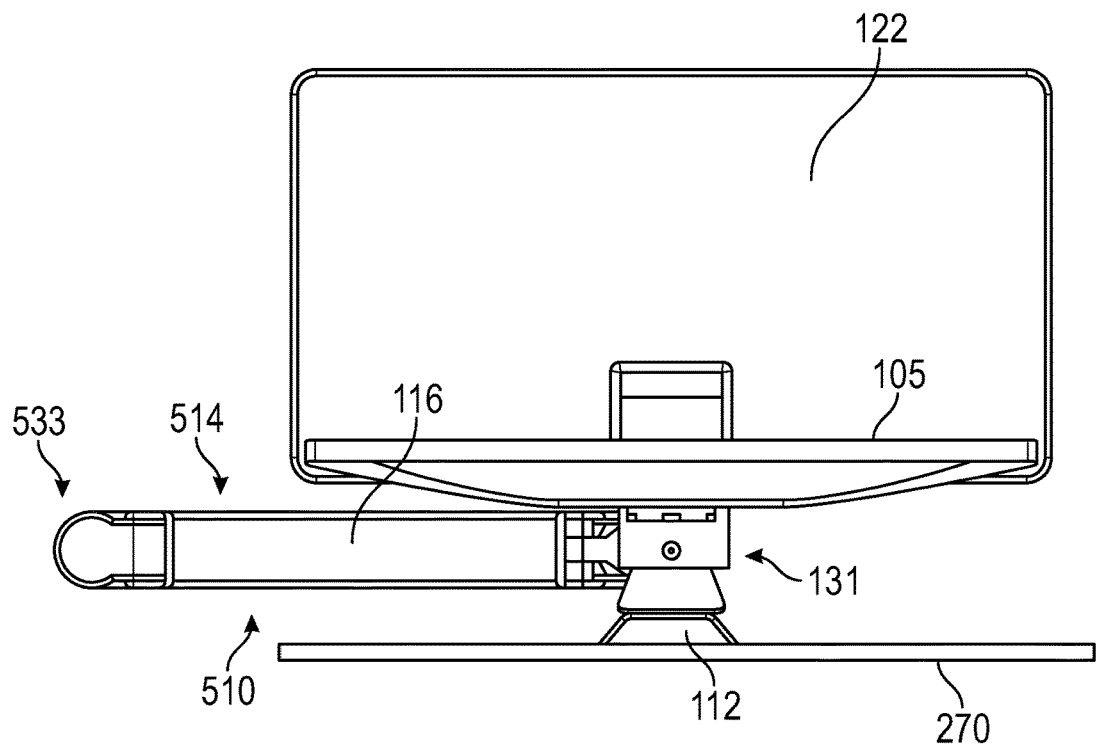
FIG. 39B is a top view of an example of a workstation in a stowed orientation.

FIG. 39B illustrates the top view of the arm assembly 510 in a second stowed configuration (e.g., stowed on the left side of the structure interface 112) according to an example configuration of the current disclosure. In the second stowed configuration, the first arm 514 can rotate in counterclockwise direction relative to the structure interface 112 at the first hinge 131, and the second arm can rotate in clockwise direction relative to the first arm 514 at the second hinge 533, The second arm 116 can overlap with the first arm 514 in the second stowed configuration.

Figure 40A:
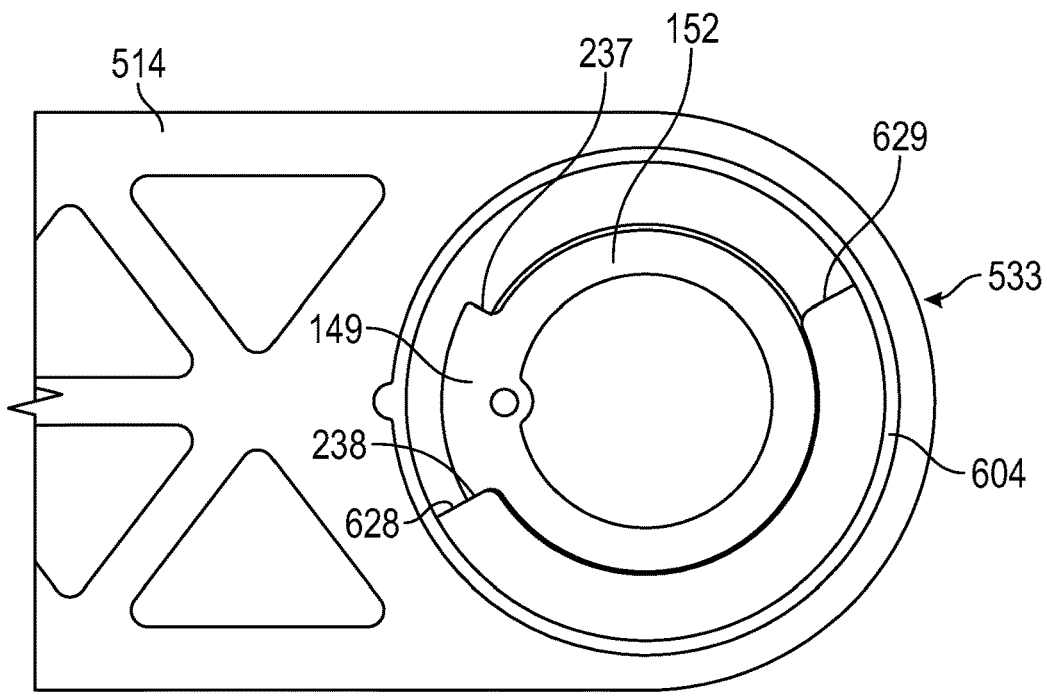
FIG. 40A is the cross-sectional view A-A of FIG. 37 of the second hinge at the stowed orientation of FIG. 39A.
Figure 40B:
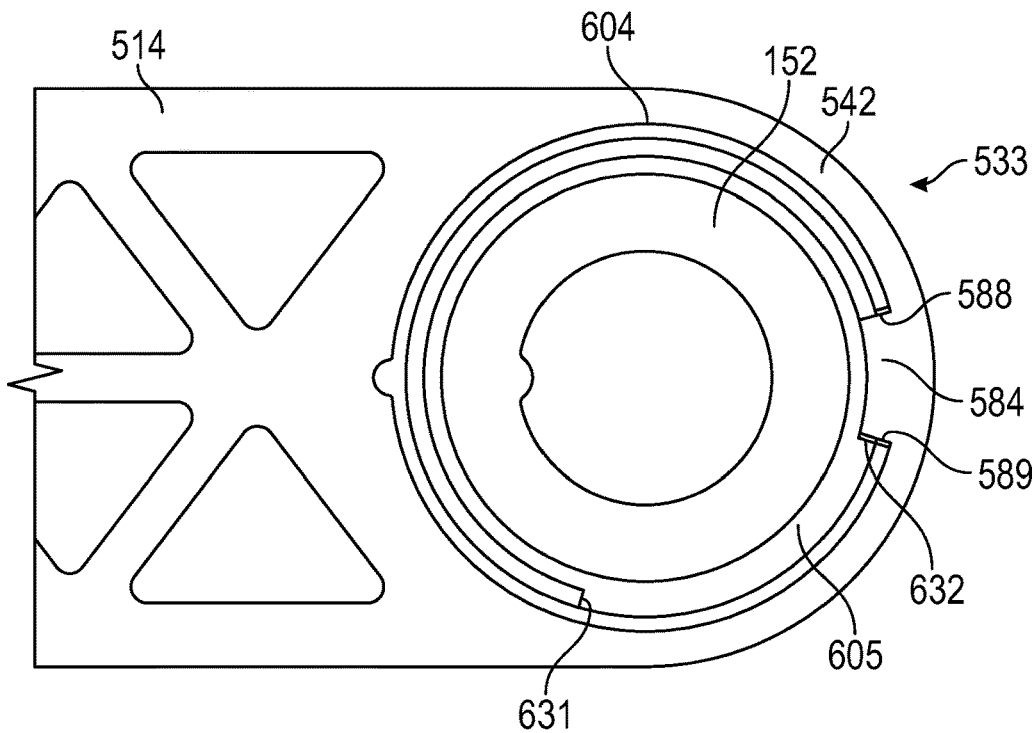
FIG. 40B is the cross-sectional view B-B of FIG. 37 of the second hinge at the stowed orientation of FIG. 39A.

FIGS. 40A-B are partial cross-sectional top views of the arm assembly showing the interaction between various components of the second hinge when the arm assembly is in the first stowed configuration of FIG. 39A FIG. 40A is the cross-sectional view A-A of FIG. 37 taken at a first elevation, and FIG. 40B is the cross-sectional view B-B of FIG. 37 taken at a second elevation.

Figure 41A:
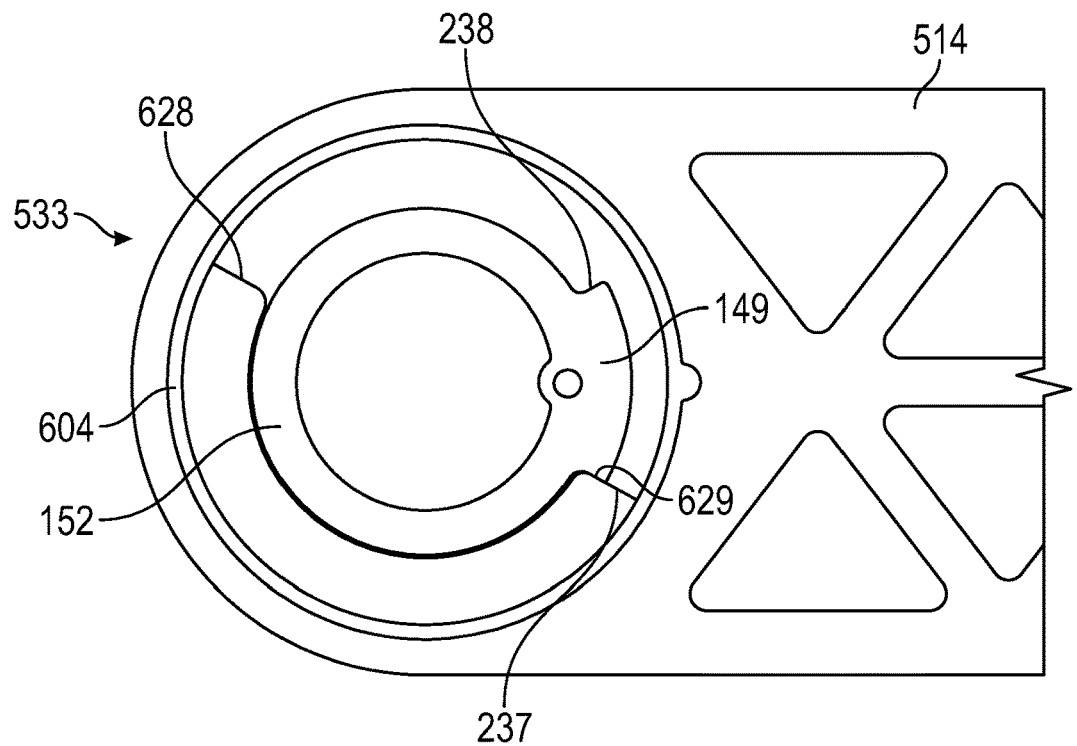
FIG. 41A is the cross-sectional view A-A of FIG. 37 of the second hinge at the stowed orientation of FIG. 39B.
Figure 41B:
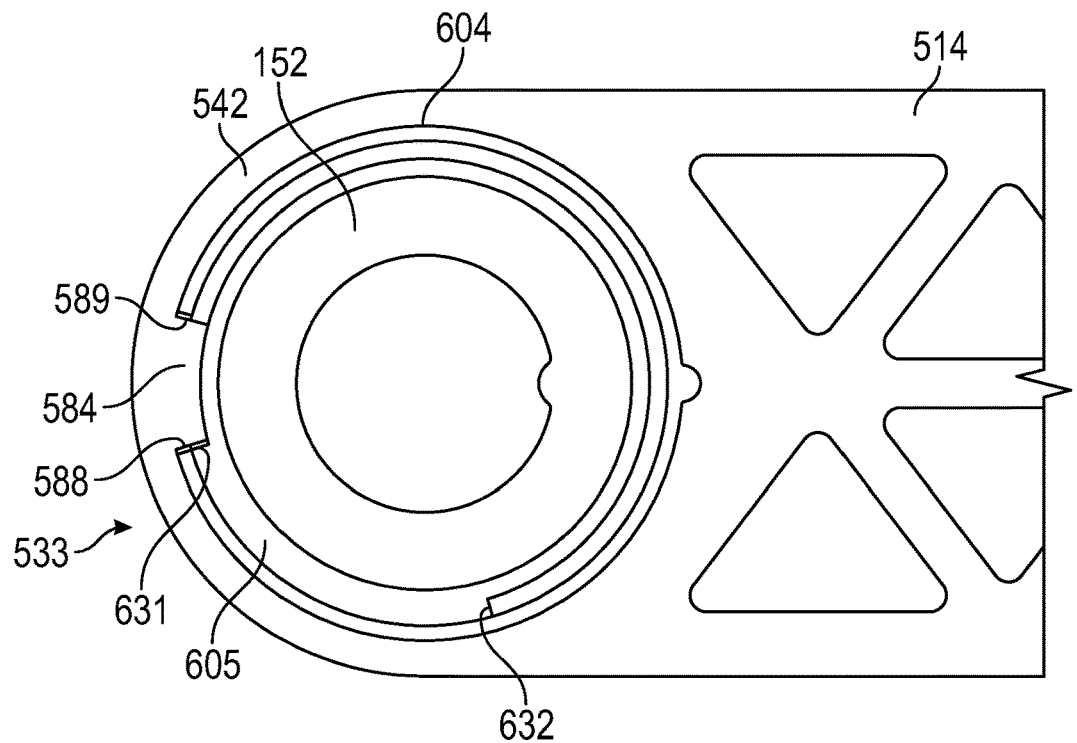
FIG. 41B is the cross-sectional view B-B of FIG. 37 of the second hinge at the stowed orientation of FIG. 39B.

FIGS. 41A-B are partial cross-sectional top views of the arm assembly showing the interaction between various components of the second hinge when the arm assembly is in the second stowed configuration of FIG. 39B.

FIG. 41A is the cross-sectional view A-A of FIG. 37 taken at a first elevation, and FIG. 41B is the cross-sectional view B-B of FIG. 37 taken at a second elevation.

The boss 149 of the first block shaft 152 can at least partially overlap with the overhung section 626 of the stop ring 605. During the rotation of the second arm 116 relative to the first arm 514 in counterclockwise direction, the second side 238 can interact with the first end 628 as illustrated in FIG. 40A, or during the rotation of the second arm 116 relative to the first arm 514 in clockwise direction, the first side 237 can interact with the second end 629 as illustrated in FIG. 41A such that the stop ring 605 can rotate together with the second arm 116 in respective directions.

The tab 584 can be inserted into the opening 616 located on the second bushing 604. The tab 584 can be at least partially located inside the second bushing 604. During the rotation of the second arm 116 relative to the first arm in counterclockwise direction, the second edge 632 can interact with the second stop 589 as illustrated in FIG. 40B, or during the rotation of the second arm 116 relative to the first arm 514 in clockwise direction, the first edge 631 can interact with the first stop 588 as illustrated in FIG. 41B to immobilize the rotation of the second arm 116 relative to the first arm 514.

ADDITIONAL NOTES AND ASPECTS

Aspect 1 may include or use subject matter (such as an apparatus, a system, a device, a method, a means for performing acts, or a device readable medium including instructions that, when performed by the device, may cause the device to perform acts), such as may include or use an articulating arm assembly, the arm assembly comprising: a structure interface; a first arm; a second arm rotatingly coupled to the first arm, wherein the second arm is configured to rotate relative to the first arm between a stowed orientation and an extended orientation; a mount assembly wherein the mount assembly is adapted to be coupled to one or more electronic devices; and a rotation stop assembly; wherein the rotation stop assembly is configured to limit a rotation angle between the first arm and the second arm in a range between 0 degrees in the stowed orientation and less than 180 degrees in the extended orientation.

Aspect 2 may include or use, or may optionally be combined with the subject matter of Aspect 1, to optionally include or use wherein the second arm is configured to overlap with the first arm in the stowed orientation, and wherein the second arm is configured to rotate away from the first arm in the extended orientation.

Aspect 3 may include or use, or may optionally be combined with the subject matter of Aspect 2, to optionally include or use wherein the rotation stop assembly is bi-directional, and wherein the rotation stop assembly is adaptable for a clockwise or a counterclockwise rotation of the second arm relative to the first arm between the stowed orientation to the extended orientation.

Aspect 4 may include or use, or may optionally be combined with the subject matter of Aspect 1, to optionally include or use wherein the structure interface is a wall mount.

Aspect 5 may include or use, or may optionally be combined with the subject matter of Aspect 1, to optionally include or use wherein the first arm is one of an extension arm or a height adjustable arm, and wherein the second arm is one of an extension arm or a height adjustable arm.

Aspect 6 may include or use, or may optionally be combined with the subject matter of Aspect 1, to optionally include or use wherein the arm assembly further comprising a rotation stop ring, and wherein the rotation stop ring is coupled to the first arm.

Aspect 7 may include or use, or may optionally be combined with the subject matter of Aspect 6, to optionally include or use wherein the rotation stop ring includes: a first aperture; a second aperture: a first stop Surface proximate the first aperture; and a second stop surface proximate the second aperture.

Aspect 8 may include or use, or may optionally be combined with the subject matter of Aspect 7, to optionally include or use wherein the rotation stop assembly further includes: a knob; a nut; a plunger having a first end and a second end coupled to the knob, wherein the plunger at least partially located inside the nut; and a spring coupled to the nut and to the plunger; wherein the plunger is configured to translate relative to the nut between a first position and a second position, wherein the first end is away from the nut in the first position and the first end is proximate the nut in the second position; and wherein the spring is adapted to bias the plunger towards the first position.

Aspect 9 may include or use, or may optionally be combined with the subject matter of Aspect 8, to optionally include or use wherein the second arm includes a boss comprising: a first edge; and a second edge; wherein the boss, the first edge, and the second edge rotate with the second arm.

Aspect 10 may include or use, or may optionally be combined with the subject matter of Aspect 9, to optionally include or use wherein the first end engages with the first aperture when the plunger is in the first position Aspect 11 may include or use, or may optionally be combined with the subject matter of Aspect 9, to optionally include or use wherein the first end engages with the second aperture when the plunger is in the first position.

Aspect 12 may include or use, or may optionally be combined with the subject matter of Aspect 10, to optionally include or use wherein the first edge is adapted to cooperate with the first stop surface to stop the rotation of the second arm relative to the first arm in the extended orientation, and wherein the second edge is adapted to cooperate with the second stop surface to stop the rotation of the second arm relative to the first arm in the stowed orientation.

Aspect 13 may include or use, or may optionally be combined with the subject matter of Aspect 11, to optionally include or use wherein the first edge is adapted to cooperate with the first stop surface to stop the rotation of the second arm relative to the first arm in the retracted orientation, and wherein the second edge is adapted to cooperate with the second stop surface to stop the rotation of the second arm relative to the first arm in the extended orientation.

Aspect 14 may include or use subject matter (such as an apparatus, a system, a device, a method, a means for performing acts, or a device readable medium including instructions that, when performed by the device, may cause the device to perform acts), such as may include or use an articulating arm assembly, the arm assembly comprising: a structure interface: a first arm: a second arm rotatingly coupled to the first arm, wherein the second arm is configured to rotate relative to the first arm between a stowed orientation and an extended orientation: a mount assembly; wherein the mount assembly is adapted to be coupled to one or more electronic devices; and a rotation stop assembly; wherein the rotation stop assembly is configured to limit a rotation of the second arm relative to the first arm.

Aspect 15 may include or use, or may optionally be combined with the subject matter of Aspect $14_1$ to optionally include or use wherein the first arm is one of an extension arm or a height adjustable arm, and wherein the second arm is one of an extension arm or a height adjustable arm.

Aspect 16 may include or use, or may optionally be combined with the subject matter of Aspect 14, to optionally include or use wherein the second arm is configured to overlap with the first arm in the stowed orientation, and the second arm is configured to rotate away from the first arm in the extended orientation.

Aspect 17 may include or use, or may optionally be combined with the subject matter of Aspect 16, to optionally include or use wherein the stowed orientation is one of a first stowed orientation, and a second stowed orientation, wherein the arm assembly is located on the left side of the structure interface in the first stowed orientations, and the arm assembly is located on the right side of the structure interface in the second stowed orientations.

Aspect 18 may include or use, or may optionally be combined with the subject matter of Aspect 17, to optionally include or use wherein the second arm rotates in counterclockwise direction relative to the first arm to place the arm assembly in the first stowed orientation, and wherein the second arm rotates in clockwise direction relative to the first arm to place the arm assembly in the second stowed orientation Aspect 19 may include or use, or may optionally be combined with the subject matter of Aspect 18, to optionally include or use wherein the rotation stop assembly is bi-directional, and wherein the rotation stop assembly is adaptable for a clockwise or a counterclockwise rotation of the second arm relative to the first arm.

Aspect 20 may include or use, or may optionally be combined with the subject matter of Aspect 19, to optionally include or use wherein the rotation stop assembly further comprising a rotation stop ring, and wherein the rotation stop ring is coupled to the first arm.

Aspect 21 may include or use, or may optionally be combined with the subject matter of Aspect 20, to optionally include or use wherein the rotation stop ring comprising: a recessed section, including; a first edge, and a second edge, and an overhung section, including; a first end proximate the first edge; and a second end proximate the second edge.

Aspect 22 may include or use, or may optionally be combined with the subject matter of Aspect 21, to optionally include or use wherein the second arm includes a boss having: a first side; and a second side; wherein the boss, the first side, and the second side rotate with the second arm.

Aspect 23 may include or use, or may optionally be combined with the subject matter of Aspect 22, to optionally include or use wherein the second side cooperates with the first end and the second edge cooperates with the second stop to place the arm assembly in the first stowed orientation.

Aspect 24 may include or use, or may optionally be combined with the subject matter of Aspect 22, to optionally include or use w % herein the first side cooperates with the second end and the first edge cooperates with the first stop to place the arm assembly in the second stowed orientation.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The claimed invention is:

1. An articulating arm assembly, the arm assembly comprising:
    a structure interface;
    a first arm rotatingly coupled to the structure interface;
    a second arm rotatingly coupled to the first arm at a first hinge, wherein the second arm is configured to rotate relative to the first arm between a stowed orientation and an extended orientation;
    a mount assembly rotatingly coupled to the second arm; wherein the mount assembly is adapted to be coupled to one or more electronic devices; and
    a rotation stop assembly disposed at least partially within the first hinge and configured to limit a rotation angle between the first arm and the second arm in a range between 0 degrees in the stowed orientation and less than 180 degrees in the extended orientation, the rotation stop assembly also configured to:
        permit clockwise rotation and limit counterclockwise rotation of the second arm relative to the first arm when the first arm rotates counterclockwise relative to the structure interface; and
        permit counterclockwise rotation and limit clockwise rotation of the second arm relative to the first arm when the first arm rotates counterclockwise relative to the structure interface.

2. The articulating arm assembly of claim 1, wherein the second arm is configured to overlap with the first arm in the stowed orientation, and wherein the second arm is configured to rotate away from the first arm in the extended orientation.

3. The articulating arm assembly of claim 1, wherein the structure interface is a wall mount.

4. The articulating arm assembly of claim 1, wherein the first arm is one of an extension arm or a height adjustable arm, and wherein the second arm is one of an extension arm or a height adjustable arm.

5. The articulating arm assembly of claim 1, wherein the arm assembly further comprising a rotation stop ring, and wherein the rotation stop ring is coupled to the first arm.

6. The articulating arm assembly of claim 5, wherein the rotation stop ring includes:
    a first aperture;
    a second aperture;
    a first stop surface proximate the first aperture; and
    a second stop surface proximate the second aperture.

7. The articulating arm assembly of claim 6, wherein the rotation stop assembly further comprises:
    a knob;
    a nut;
    a plunger having a first end and a second end coupled to the knob, wherein the plunger at least partially located inside the nut; and
    a spring coupled to the nut and to the plunger;
    wherein the plunger is configured to translate relative to the nut between a first position and a second position, wherein the first end is away from the nut in the first position and the first end is proximate the nut in the second position; and wherein the spring is adapted to bias the plunger towards the first position.

8. The articulating arm assembly of claim 7, wherein the second arm includes a boss comprising:
    a first edge; and
    a second edge;
    wherein the boss, the first edge, and the second edge rotate with the second arm.

9. The articulating arm assembly of claim 8, wherein the first end engages with the first aperture when the plunger is in the first position.

10. The articulating arm assembly of claim 8, wherein the first end engages with the second aperture when the plunger is in the first position, the first edge is adapted to cooperate with the first stop surface to stop the rotation of the second arm relative to the first arm in the extended orientation, and wherein the second edge is adapted to cooperate with the second stop surface to stop the rotation of the second arm relative to the first arm in the stowed orientation.

11. The articulating arm assembly of claim 10, wherein the first edge is adapted to cooperate with the first stop surface to stop the rotation of the second arm relative to the first arm in the stowed orientation, and wherein the second edge is adapted to cooperate with the second stop surface to stop the rotation of the second arm relative to the first arm in the extended orientation.

12. An articulating arm assembly, the arm assembly comprising:
   a structure interface;
   a first arm;
   a second arm rotatingly coupled to the first arm at a first hinge, wherein the second arm is configured to rotate relative to the first arm between a stowed orientation and an extended orientation;
   a mount assembly; wherein the mount assembly is adapted to be coupled to one or more electronic devices; and
   a rotation stop assembly disposed at least partially within the first hinge;
   wherein the rotation stop assembly is configured to:
      permit clockwise rotation and limit counterclockwise rotation of the second arm relative to the first arm when the first arm rotates counterclockwise relative to the structure; and
      permit counterclockwise rotation and limit clockwise rotation of the second arm relative to the first arm when the first arm rotates counterclockwise relative to the structure interface.

13. The articulating arm assembly of claim 12, wherein the first arm is one of an extension arm or a height adjustable arm, and wherein the second arm is one of an extension arm or a height adjustable arm.

14. The articulating arm assembly of claim 12, wherein the second arm is configured to overlap with the first arm in the stowed orientation, and the second arm is configured to rotate away from the first arm in the extended orientation.

15. The articulating arm assembly of claim 14, wherein the stowed orientation is one of a first stowed orientation, and a second stowed orientation, wherein the arm assembly is located on a left side of the structure interface in the first stowed orientation, and the arm assembly is located on a right side of the structure interface in the second stowed orientations.

16. The articulating arm assembly of claim 15, wherein the second arm rotates in counterclockwise direction relative to the first arm to place the arm assembly in the first stowed orientation, and wherein the second arm rotates in clockwise direction relative to the first arm to place the arm assembly in the second stowed orientation.

17. The articulating arm assembly of claim 16, wherein the rotation stop assembly is bi-directional, and wherein the rotation stop assembly is adaptable for a clockwise or a counterclockwise rotation of the second arm relative to the first arm, the rotation stop assembly further comprising a rotation stop ring, and wherein the rotation stop ring is coupled to the first arm.

18. The articulating arm assembly of claim 17, wherein the rotation stop ring comprises:
   a recessed section, including;
   a first edge, and
   a second edge, and
   an overhung section, including;
   a first end proximate the first edge; and
   a second end proximate the second edge.

19. The articulating arm assembly of claim 18, wherein the second arm includes a boss having:
   a first side; and
   a second side;
   wherein:
   the boss, the first side, and the second side rotate with the second arm; and
   the second side cooperates with the first end and the second edge cooperates with the second stop surface to place the arm assembly in the first stowed orientation.

20. The articulating arm assembly of claim 19, wherein the first side cooperates with the second end and the first edge cooperates with the first stop surface to place the arm assembly in the second stowed orientation.

* * * * *